US012762160B2

(12) United States Patent
Bhattacharyya et al.

(10) Patent No.: US 12,762,160 B2
(45) Date of Patent: Oct. 13, 2026

(54) DATA DISCOVERY, VISUALIZATION, AND ADVANCED ANALYTICS SYSTEM AND METHOD

(71) Applicant: Madhumita Bhattacharyya, Flower Mound, TX (US)

(72) Inventors: Madhumita Bhattacharyya, Flower Mound, TX (US); Sudip Bhattacharyya, Flower Mound, TX (US)

(73) Assignee: Madhumita Bhattacharyya

( * ) Notice: Subject to any disclaimer, the term of this patent is extended or adjusted under 35 U.S.C. 154(b) by 14 days.

(21) Appl. No.: 18/197,193

(22) Filed: May 15, 2023

(65) Prior Publication Data

US 2023/0376508 A1 Nov. 23, 2023

Related U.S. Application Data

(60) Provisional application No. 63/342,883, filed on May 17, 2022.

(51) Int. Cl.
*G06F 16/28* (2019.01)
*G06F 16/25* (2019.01)
(Continued)

(52) U.S. Cl.
CPC .......... *G06F 16/287* (2019.01); *G06F 16/258* (2019.01); *G06F 16/26* (2019.01); *H04L 63/0884* (2013.01)

(58) Field of Classification Search
CPC ...... G06F 16/258; G06F 16/26; G06F 16/287; G06F 21/6245; G06F 21/31; G06F 21/84;
(Continued)

(56) References Cited

U.S. PATENT DOCUMENTS 7,987,054 B2 * 7/2011 Anatoly .................... G01V 1/36
367/38
8,239,847 B2 * 8/2012 Yu .......................... G06F 9/5066
717/149
(Continued)

FOREIGN PATENT DOCUMENTS

CN 106851634 A * 6/2017 ............ H04W 12/02

OTHER PUBLICATIONS

Wu et al., "New Algorithm for Computing Cube on Very Large Compressed Data Sets", IEEE Transactions on Knowledge & Data Engineering, vol. 18, No. 12, Dec. 2006. (Year: 2006).*

*Primary Examiner* — Apu M Mofiz
*Assistant Examiner* — Hubert Cheung
(74) *Attorney, Agent, or Firm* — Jason C. Cameron

(57) ABSTRACT

A system includes a memory storing computer-readable instructions and at least one processor to execute the instructions to receive database authentication information from a client computing device, obtain data from a first data source using the database authentication information, the first data source storing data having a first representation of the data, store the data in a second data source, the second data source having a second representation of the data that is different from the first representation of the data, receive a request to create a visualization of the data and generate a visualization of the data using the second representation of the data, and transmit the visualization of the data to the client computing device.

9 Claims, 20 Drawing Sheets

(51) Int. Cl.
*G06F 16/26* (2019.01)
*H04L 9/40* (2022.01)

(58) Field of Classification Search
CPC ........ G06F 2221/2139; H04L 63/0884; G06N 20/00
See application file for complete search history.

(56) References Cited

U.S. PATENT DOCUMENTS

| | | | | |
|---|---|---|---|---|
| 2005/0050030 | A1* | 3/2005 | Gudbjartsson | G06F 16/284 |
| 2009/0288823 | A1* | 11/2009 | Baumstein | G01V 1/36<br>166/250.16 |
| 2010/0241828 | A1* | 9/2010 | Yu | H04L 12/44<br>712/30 |
| 2013/0326614 | A1* | 12/2013 | Truskovsky | H04W 12/37<br>726/19 |
| 2014/0279857 | A1* | 9/2014 | Bharadwaj | G06F 16/25<br>707/609 |
| 2016/0179897 | A1* | 6/2016 | Zheng | G06F 16/289<br>707/722 |
| 2016/0358103 | A1* | 12/2016 | Bowers | G06F 9/4881 |
| 2017/0272472 | A1* | 9/2017 | Adhar | G06F 21/602 |
| 2018/0341388 | A1* | 11/2018 | Zheng | G06T 11/206 |
| 2019/0025786 | A1* | 1/2019 | Park | G05B 15/02 |
| 2019/0042103 | A1* | 2/2019 | Stabrawa | G06F 3/067 |
| 2019/0158815 | A1* | 5/2019 | He | H04N 21/234345 |
| 2019/0163679 | A1* | 5/2019 | Srinivasa | G16H 50/70 |
| 2019/0361411 | A1* | 11/2019 | Park | G05B 15/02 |
| 2019/0361412 | A1* | 11/2019 | Park | G05B 15/02 |
| 2020/0007556 | A1* | 1/2020 | Brebner | G06F 16/958 |
| 2023/0023134 | A1* | 1/2023 | Kiryakov | G06N 5/04 |
| 2023/0153641 | A1* | 5/2023 | Manda | G06F 40/295<br>707/603 |
| 2023/0169041 | A1* | 6/2023 | Baessler | G06F 16/1748<br>707/692 |
| 2023/0259499 | A1* | 8/2023 | Kazmi | G06Q 40/08<br>707/601 |
| 2023/0298589 | A1* | 9/2023 | Madan | G10L 15/22<br>704/9 |
| 2023/0336588 | A1* | 10/2023 | Adams | G06F 40/20 |
| 2025/0047663 | A1* | 2/2025 | Brennan | H04L 67/141 |

* cited by examiner

800

1000

1900

DATA DISCOVERY, VISUALIZATION, AND ADVANCED ANALYTICS SYSTEM AND METHOD

CROSS-REFERENCE TO RELATED APPLICATIONS

This application claims priority under 35 U.S.C. § 119 to U.S. Patent Application No. 63/342,883, filed May 17, 2022 entitled "Data Analytical Engine System and Method," the entire contents of which is incorporated herein by reference.

BACKGROUND

Conventional data, analytics, and business intelligence systems have a number of shortcomings. There are a number of conventional solutions from different vendors that try to meet cross-sector needs. As an example, the banking industry faces a number of challenges including meeting customer demands and wanting to proactively protect against fraud and security breaches. Healthcare providers are unable to analyze and interpret the vast amount of medical data, providing issues for patients and care providers. This can have major consequences including reduced speed of care for patients and even more importantly, effects on survival rate. With tightening supply chains and downward pressure on operating margins, manufacturing continues to struggle with hard-to-solve optimization problems. Retailers are being challenged by customers that expect improved visibility of customers' shopping preferences and expectations. Unfortunately, each different industry has different data and analytics needs that are not being met. Often, the approach is to mix and match a number of disparate tools and skillsets which makes the entire data to insight ecosystem complex, expensive, and difficult to adopt.

It is with these issues in mind, among others, that various aspects of the disclosure were conceived.

SUMMARY

The present disclosure is directed to a data analytical engine system and method. The system may include a client computing device that communicates with a server computing device to combine data from a number of data sources into one organized and manipulable data source that may have a particular structure and representation to reduce latency and provides significant memory usage improvements. As an example, the user can create a variety of different visualizations on the data. The system may provide recommendations for the different visualizations. The user can also create a dashboard having the one or more visualizations and share the dashboard.

In one example, a system may include a memory storing computer-readable instructions and at least one processor to execute the instructions to receive database authentication information from a client computing device, continually obtain data from a first data source using the database authentication information, the first data source storing data having a first representation of the data, continually convert and store the data in a second data source in real-time as the data is received in the first data source, the second data source having a second representation of the data that is different from the first representation of the data, receive a selection of at least one machine learning algorithm from a customizable library of machine learning algorithms, each machine learning algorithm to perform at least one operation on the data in the second data source, receive a request to create a visualization of the data and generate a visualization of the data using the second representation of the data based on the at least one machine learning algorithm, and transmit the visualization of the data to the client computing device.

In another example, a method may include receiving, by at least one processor, database authentication information from a client computing device, continually obtaining, by the at least one processor, data from a first data source using the database authentication information, the first data source storing data having a first representation of the data, continually converting and storing, by the at least one processor, the data in a second data source, the second data source having a second representation of the data that is different from the first representation of the data, receiving, by the at least one processor, a selection of at least one machine learning algorithm from a customizable library of machine learning algorithms, each machine learning algorithm to perform at least one operation on the data in the second data source, receiving, by the at least one processor, a request to create a visualization of the data and generating a visualization of the data using the second representation of the data based on the at least one machine learning algorithm, and transmitting, by the at least one processor, the visualization of the data to the client computing device.

In another example, a non-transitory computer-readable storage medium may have instructions stored thereon that, when executed by a computing device cause the computing device to perform operations, the operations including receiving database authentication information from a client computing device, continually obtaining data from a first data source using the database authentication information, the first data source storing data having a first representation of the data, continually converting and storing the data in a second data source, the second data source having a second representation of the data that is different from the first representation of the data, receiving a selection of at least one machine learning algorithm from a customizable library of machine learning algorithms, each machine learning algorithm to perform at least one operation on the data in the second data source, receiving a request to create a visualization of the data and generating a visualization of the data using the second representation of the data based on the at least one machine learning algorithm, and transmitting the visualization of the data to the client computing device.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
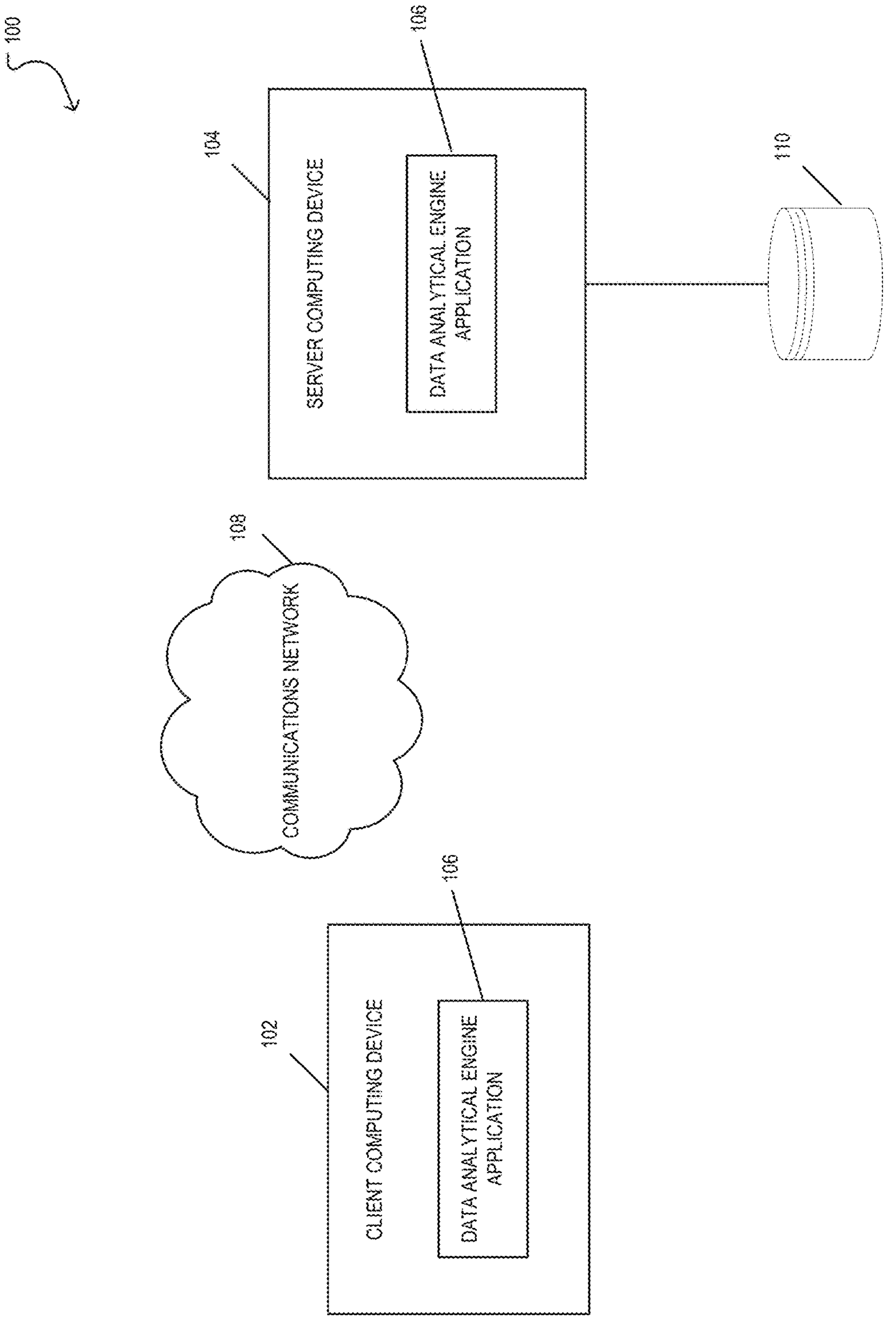
FIG. 1 is a block diagram of a data analytical engine system according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The business playing field has always been highly competitive. Artificial intelligence (AI) has arrived and has changed the game. AI is already beginning to disrupt the competitive balance and create new challenges. However, adopting AI-based decision-making solutions has been the exclusive privilege of multi-billion-dollar organisations. For smaller organizations, it is not so easy. Even for those who want to make the transition to AI, it is often too costly and complex. Lack of talent and access to relevant data, infrastructure, too many point solutions and system integration partners to choose from leads to uncertain return on investment (ROI)—ultimately resulting in low AI adoption even more for small and medium businesses.

For example, what if a retailer would want to have the top 2% of its customer base to shop one more time? Or, as another example, what if a credit union would want to know the probability of default of all the clients who have applied for loans in their bank? There are many use cases. The conventional approach has been to mix and match a number of disparate tools and skillsets, which makes the entire data to insight ecosystem complex, expensive, and difficult to adopt data based AI driven decision making.

Aspects of a data analytical engine system and method includes a client computing device that communicates with a server computing device to combine data from a number of data sources into one organized and manipulable data source that may have a particular structure and representation to reduce latency and provides significant memory usage improvements. As an example, the user can create a variety of different visualizations on the data. The system may provide recommendations for the different visualizations. The user can also create a dashboard having the one or more visualizations and share the dashboard.

There is currently not a single no-code platform that allows end-to-end data processing, data wrangling, and data quality services. The data analytical engine system provides a customizable artificial intelligence (AI) models, machine learning (ML) algorithms, deep learning (DL) algorithms, and natural language processing (NLP) algorithms that can be used to provide data visualization and recommendations. Conventionally, the approach was to mix and match a number of different lacking tools and attempt to integrate the tools to enable end-to-end business requirements. Unfortunately, this required multiple teams with specific skillsets, increased costs, and reduced return on investment. The data analytical engine system solves these problems to provide improvements and more efficient use of computing resources, human resources, as well as financial resources.

The data analytical engine system allows a variety of different industry sectors to make better decisions by transforming data into decision-based actions and insights. The system provides scenario analysis, streaming data processing, and real-time analytics. Realtime insights can be generated for a particular organization or can be shared with others using the system.

The data analytical engine system utilizes directed acrylic graphs (DAGs), dynamic aggregation, in-memory access, and use of hypercube data organization to provide improved data latency. As an example, a user can use a browser and/or a native client application to access and view data stored in a database. The system allows the user to develop, apply access rights, define enterprise level data governance and security, analyze, and publish information and analytics associated with the data in the database. The user can even provide access to the data using a third party portal using single sign on (SSO).

As an example, the data analytical engine system solves issues associated with the conventional fragmented vendor marketplace. The system provides a unique approach to data ingestion as well as cognitive or self-service search that allows a user to generate and create dimensional and analytical visualizations of the data in a database or data source. For a user, the system provides data discovery, visualization, and advanced analytics. On the back end, the system provides data management, warehousing, data pipeline, machine learning modelling to visual platform development, distribution, and ad-hoc, batch, or near real-time data processing via analytical modelling.

The data analytical engine provides data binding, blending, wrangling, and exploration. Using a cognitive approach, the data analytical engine can extract data from a dataset while simultaneously creating an automatic hierarchy. A user does not have to create a data hierarchy manually. As an example, the system provides artificial intelligence that can extract data based on a data field or data type in the database such as Discount, User, City, Country, Location, Price, or a Company Name, among others.

Conventionally, legacy business intelligence tools made a user choose date or time dimensions. However, the data analytical engine system eliminates this problem because date fields may reside in a particular hypercube created by the data analytical engine system. The dimension may be automatically generated using a slicing technique. As a result, the user does not have to choose a particular time dimension such as month, year, fiscal year, or quarter. Even further, a user can view data in the database or data source based on different levels of users. Each user may have particular rights that may be allocated to users depending on a user's role and data governance rules.

The data analytical engine system enables maximum data visibility for performing queries. Operational data, aggregated summaries, and offset cubes may be quickly generated by automatically defining the data structures. The offset cubes may be structured with aggregation happening on-the-fly and when data is ingested into a connected database. Regeneration of cubes or reloading to create highlights when new data arrives is not necessary. The data analytical engine system utilizes in-memory, relational augmentation, and dynamic aggregation. As a result, the data analytical engine system can tackle big data challenges and be used with a variety of different databases and data sources including a NoSQL database, a data warehouse, or a relational database management system (RDBMS), among others.

In short, the data analytical engine system provides an end-to-end no-code data to insight platform that has data management capabilities, includes a customizable AI/ML algorithm and model bank, real time data visualization, and generative AI enabled recommendation capabilities. The data analytical engine system enables the end user to not only seamlessly access, manage and prepare the data, identify and run the relevant AI models, and visualize the output of the model. The system also has the capability to interpret the output of the AI/ML algorithm in plain and simple English to guide the user with appropriate decision making. The system eliminates and/or minimizes the use of disparate information technology (IT) softwares, skillsets, and systems integration (SI) partners. The design of the system is uniquely built to make AI adoption accessible and affordable (financially and computationally).

The data analytical engine system is also modularized as WaiS Data (data management capabilities), WaiS Algo (AI model and machine learning algorithm bank), WaiS Visual Analytics (Data Visualization and Recommendation capabilities) that can be leveraged individually per client or user requirements.

FIG. 1 is a block diagram of a data analytical engine system 100 according to an example of the instant disclosure. As shown in FIG. 1, the system 100 may include at least one client computing device 102 and at least one server computing device 104. The at least one server computing device 104 may be in communication with at least one database 110.

The client computing device 102 and the server computing device 104 may have a data analytical engine application 106 that may be a component of an application and/or service executable by the at least one client computing device 102 and/or the server computing device 104. For example, the data analytical engine application 106 may be a single unit of deployable executable code or a plurality of units of deployable executable code. According to one aspect, the data analytical engine application 106 may include one component that may be a web application, a native application, and/or an application (e.g., an app) downloaded from a digital distribution application platform that allows users to browse and download applications developed with software development kits (SDKs) including the APPLE® iOS App Store and GOOGLE PLAY®, among others.

The data analytical engine system 100 also may include one or more data sources that store and communicate data from at least one database 110. The data stored in the at least one database 110 may be associated with users and their data sources that they connect and sync with the data analytical engine system 100. As an example, each user may have one or more data sources that they connect with the data analytical engine system 100 and the data analytical engine system 100 may combine the one or more data sources into one manipulable source of data that can be accessed and manipulated using the data analytical engine system 100.

Each user may access and generate one or more visualizations and place the one or more visualizations on one or more dashboards. The dashboards and/or the visualizations may be shared by embedding the visualizations as images, sent via email, and communicated using a specific uniform resource locator (URL) for the dashboard.

The at least one client computing device 102 and the at least one server computing device 104 may be configured to receive data from and/or transmit data through a communication network 108. Although the client computing device 102 and the server computing device 104 are shown as a single computing device, it is contemplated each computing device may include multiple computing devices.

The communication network 108 can be the Internet, an intranet, or another wired or wireless communication network. For example, the communication network may include a Mobile Communications (GSM) network, a code division multiple access (CDMA) network, 3$^{rd}$ Generation Partnership Project (GPP) network, an Internet Protocol (IP) network, a wireless application protocol (WAP) network, a WiFi network, a Bluetooth network, a near field communication (NFC) network, a satellite communications network, or an IEEE 802.11 standards network, as well as various communications thereof. Other conventional and/or later developed wired and wireless networks may also be used.

The client computing device 102 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the client computing device 102 further includes at least one communications interface to transmit and receive communications, messages, and/or signals.

The client computing device 102 could be a programmable logic controller, a programmable controller, a laptop computer, a smartphone, a personal digital assistant, a tablet computer, a standard personal computer, or another processing device. The client computing device 102 may include a display, such as a computer monitor, for displaying data and/or graphical user interfaces. The client computing device 102 may also include a Global Positioning System (GPS) hardware device for determining a particular location, an input device, such as one or more cameras or imaging devices, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The server computing device 104 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the server computing device 104 further includes at least one communications interface to transmit and receive communications, messages, and/or signals.

As an example, the client computing devices 102 and the server computing device 104 communicate data in packets, messages, or other communications using a common protocol, e.g., Hypertext Transfer Protocol (HTTP) and/or Hypertext Transfer Protocol Secure (HTTPS). The one or more computing devices may communicate based on representational state transfer (REST) and/or Simple Object Access Protocol (SOAP). As an example, a first computer (e.g., the client computing device 102) may send a request message that is a REST and/or a SOAP request formatted using Javascript Object Notation (JSON) and/or Extensible Markup Language (XML). In response to the request message, a second computer (e.g., the server computing device 104) may transmit a REST and/or SOAP response formatted using JSON and/or XML.

When users first use the data analytical engine application 106, they may be asked to create an account associated with the system. As an example, a user may provide account information including name information, an email address, username information, and password information. The account information and/or a representation of the account information may be stored in the database 110.

Figure 2:
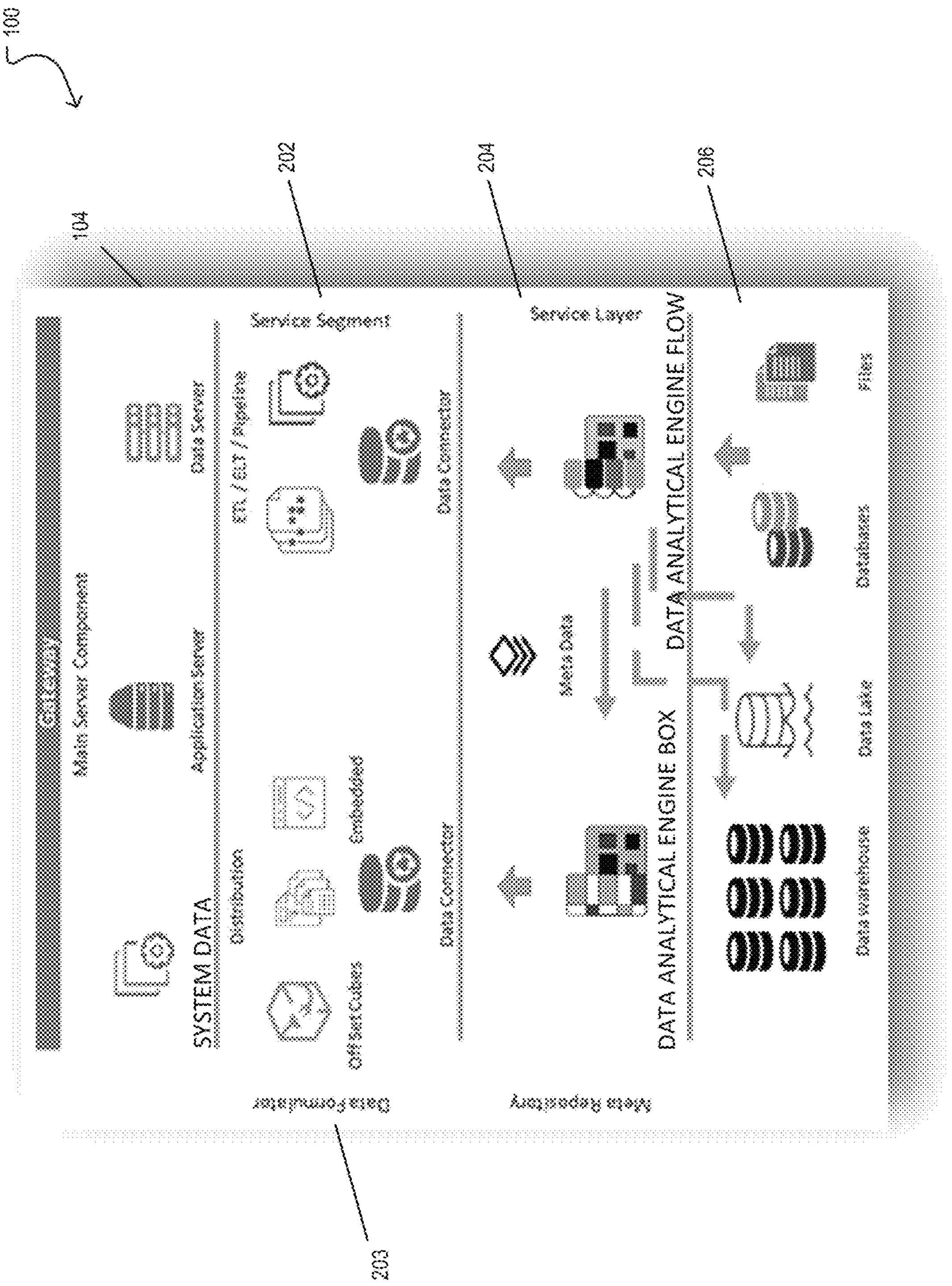
FIG. 2 is another block diagram of the data analytical engine system according to an example of the instant disclosure.

FIG. 2 shows another block diagram of the data analytical engine system 100 according to an example of the instant disclosure. In particular, FIG. 2 shows analytical and data pipelines. As shown in FIG. 2, the system 100 may include the at least one server computing device 104 that may include an application server for the data analytical engine application 106 as well as at least one data server. The system 100 may further include a service segment 202, a data formulator 203, a service layer 204, and first data sources 206. The service segment 202 may include one or more data connectors. As shown in FIG. 2, there may be a distribution data connector and/or an ETL/ELT/Pipeline data connector. The service layer 204 may include a data analytical engine flow and a data analytical engine box. The first data sources 206 may include files, databases, data lakes, and data warehouses, among others.

The first data sources 206 may include various data sources that can be connected to the analytical platform and system 100. Once the connections are configured, the service layer 204 shows engine components including the data analytical engine box and the data analytical engine flow that can be deployed against the data for the purpose of transforming the data in a way that makes it amenable for algorithmic analysis. The service layer 204 further includes a meta data repository. The service layer 204 includes mechanisms by which the metadata can be distributed and optimized. The data formulator 203 can aggregate data and visualizations are distributed via embedded links along with the ability to interrogate the data on-the-fly through the optimization of the offset cube. The service segment 202 can reach down into the datastore and meta data layer to create the ability to apply transformations to the data for more efficient analysis. The at least one server computing device 104 includes the various services, one or more application servers, and one or more data servers to manage the system 100.

The data analytical engine system 100 can perform multiple services simultaneously and may include a number of micro services. As an example, the system 100 improves read/write latency and improves memory usage that improve computing performance of the server computing device 104 as well as the client computing device 102. The system 100 may optimize data processing and improve data refreshes using master data management (MDM) to provide data quality management for data warehouse loading or real-time access using online transaction processing (OLTP). The data analytical engine system 100 manages big data from a number of different data sources using an offset cube to allow the system to rapidly query and summarize massive amounts of data. In addition, the system 100 is able to support API calls to publish analytics and visualizations with third party applications or portals. The third party applications may be implemented in a number of different ways using Node.js, .NET, JAVA, and/or PHP, among others. The third parties may utilize the API that may be run on the at least one computing device 104 separately from other services to eliminate performance latency associated with the server computing device 104. As a result, the data analytical engine system 100 provides comprehensive end-to-end analytics for decisions for a number of different industries and allows users to manipulate data using advanced analytics and visual analytics generated by artificial intelligence (AI) without writing code.

Figure 3:
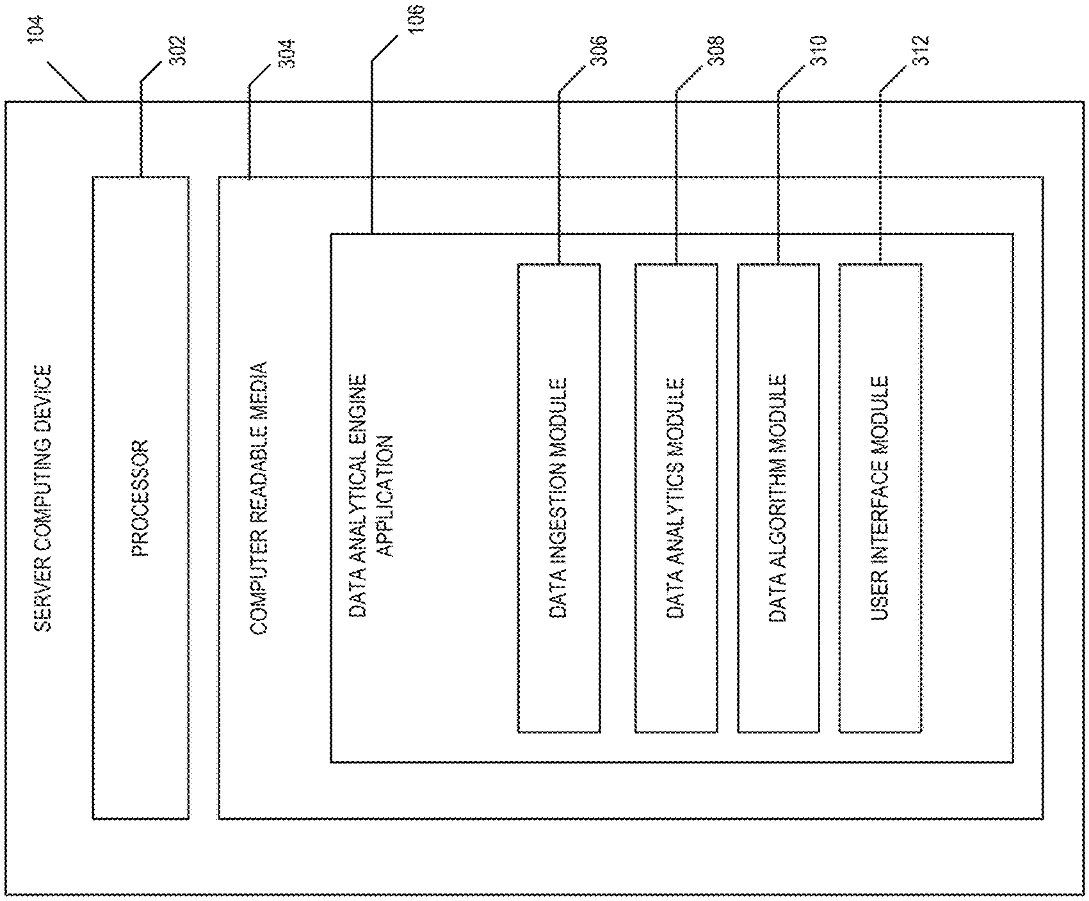
FIG. 3 shows a block diagram of a server computing device of the data analytical engine system having a data analytical engine application according to an example of the instant disclosure.

FIG. 3 is a block diagram of the data analytical engine application 106 according to an example of the instant disclosure. The data analytical engine application 106 may be executed by the server computing device 104. The server computing device 104 includes computer readable media (CRM) 304 in memory on which the data analytical engine application 106 is stored. The computer readable media 304 may include volatile media, nonvolatile media, removable media, non-removable media, and/or another available medium that can be accessed by the processor 302. By way of example and not limitation, the computer readable media 304 comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The data analytical engine application 106 may include a data ingestion module 306 according to an example of the instant disclosure. As an example, the data ingestion module 306 allows a user to provide database authentication information to connect with a particular data source and import the data in the data source to the data analytical engine system 100. The user may connect a number of data sources using the data ingestion module 306.

As an example, the data ingestion module 306 provides a data pipeline/ETL/ELT and a single interface to manipulate and access data from a variety of sources. The data may be homogeneous or heterogeneous data formats and the data ingestion module 306 provides data cleansing, data staging, and data classification. Data cleansing is addressed by seamlessly handling data orientation and representation rules that can be decided among ETL/ELT or using API-call based services using a directed acyclic graph (DAG) to govern, clean, and build the pipeline. Data classification may be used to simultaneously create an audit trail to empower data engineers to maintain effective data control. Data staging provides a single source of truth and data.

The data ingestion module 306 provides pre-built machine learning (ML) models that allow data wrangling. The data ingestion module 306 also provides an artificial intelligence (AI)-driven interface to minimize technical information to join tables and reduce time of development. A user can choose between scripting languages including Python, R, or Spark ML for model development. The data ingestion module 306 further allows a user to create an API to allow the user to connect data, analytics, and insight with other software tools.

The data analytical engine application 106 may include a data analytics module 308 according to an example of the instant disclosure. As an example, the data analytical module 308 allows a user to create one or more data visualizations and provide analytics information associated with the data that is imported into the data analytical engine system 100.

The data analytical module 308 includes a recommendation engine to aid in the interpretation of complicated statistical output in a way that is rendered intuitively to allow for better decisions. A user can create analytics and dashboard visualizations with unique, interactive filtering, and drill downs to enable an analyst to find patterns and create a story based on what the data shows. The data analytical module 308 includes scheduling and distribution options and provides a drag-and-drop interface. A user can combine multiple charts and infographics to create presentation materials. Dashboard capabilities include filtering on data sets by applying a search context so that relevant information is shown. The data analytical module 308 also allows a user to filter data using a calendar and time frames.

The data analytical engine application 106 may include a data algorithm module 310 according to an example of the instant disclosure. As an example, the data algorithm module 310 allows a user to perform a number of operations on the data that is imported into the data analytical engine system 100. As an example, the data algorithm module 310 allows a user to select from a number of pre-built algorithmic models. The pre-built algorithmic models may be held in a library that can be templatized and include advanced analytical methods that can be customized by the user. Each of the models may be selected and dragged and dropped to allow a user to obtain insight on the data and provide decision recommendations based on the data.

The data analytical engine application 106 may include a user interface module 312 according to an example of the instant disclosure. The user interface module 312 receives requests or other communications from the client computing device 102 and transmits a representation of requested information, user interface elements, and other data and communications to the client computing device 102 for display on the display. As an example, the user interface module 312 generates a native and/or web-based graphical user interface (GUI) that accepts input and provides output by generating content that is transmitted via the communications network 108 and viewed by a user of the client computing device 102. The user interface module 312 may provide realtime automatically and dynamically refreshed information to the user of the client computing device 102 using Java, Javascript, AJAX (Asynchronous Javascript and XML), ASP.NET, Microsoft .NET, and/or node.js, among others. The user interface module 312 may send data to other modules of the data analytical engine application 106 of the server computing device 104, and retrieve data from other modules of the data analytical engine application 106 of the server computing device 104 asynchronously without interfering with the display and behavior of the client computing device.

Figure 4:
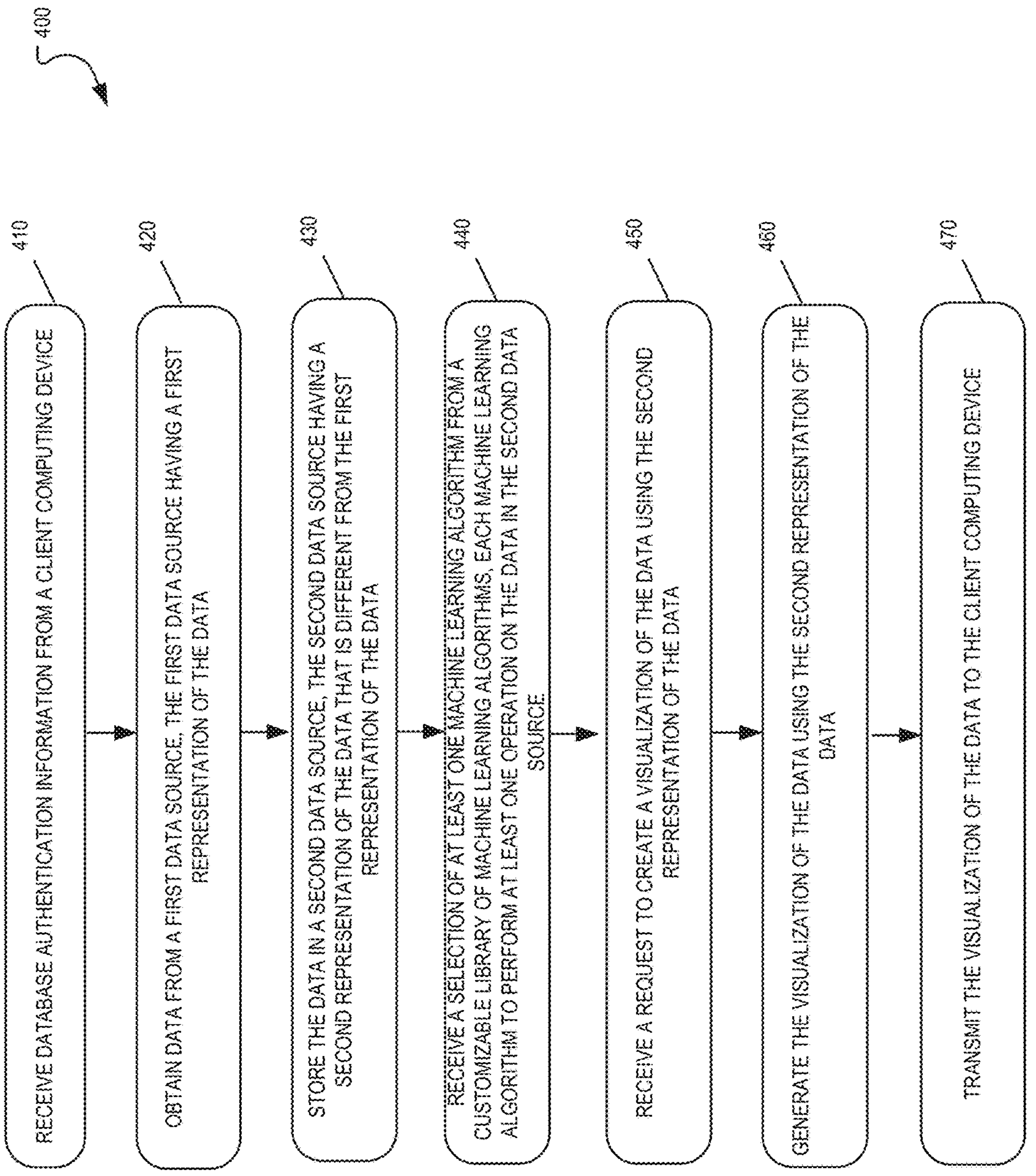
FIG. 4 is a flowchart of a method of generating a visualization of data according to an example of the instant disclosure.

FIG. 4 illustrates an example method 400 of importing data from a variety of different data sources, generating a new representation of the data from the data sources, and generating a visualization according to an example of the instant disclosure. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method 400 may include receiving database authentication information from the client computing device 102 at block 410. As an example, the database authentication information may include at least one of a database type, a name, host information, a port number, a database name, a database username, and a database password, among other information. The first data source may be at least one of one or more files, one or more databases, one or more data warehouses, and one or more relational database management systems (RDBMS), among others.

Next, according to some examples, the method 400 may include obtaining data from a first data source, the first data source having a first representation of the data at block 420. The method 400 may further include obtaining data from another number of first data sources.

Next, according to some examples, the method 400 may include storing the data in a second data source, the second data source having a second representation of the data that is different from the first representation of the data at block 430. The second data source may be associated with the database 110. According to some examples, the second representation of the data may be a hypercube. The second representation of the data can use directed acrylic graphs (DAGs), dynamic aggregation, in-memory access, and use of hypercube data organization to provide improved data latency.

Next, according to some examples, the method 400 may include receiving a selection of at least one machine learning algorithm from a customizable library of machine learning algorithms, each machine learning algorithm to perform at least one operation on the data in the second data source.

Next, according to some examples, the method 400 may include receiving a request to create a visualization of the data using the second representation of the data at block 450.

Next, according to some examples, the method 400 may include generating the visualization of the data using the second representation of the data at block 460.

Next, according to some examples, the method 400 may include transmitting the visualization of the data to the client computing device 102 for display on a display at block 470. According to some examples, the method 400 may include determining a particular recommendation for the visualization of the data. According to some examples, the method 400 may include selecting an analytical model from a pre-built algorithmic model bank and generating the visualization of the data using the analytical model. According to some examples, the method 400 may include receiving a selection of a subset of machine learning algorithms from the customizable library of machine learning algorithms as favorite machine learning algorithms and adding at least one of the subset of machine learning algorithms to a template to perform at least one operation on the data.

The data analytical engine system 100 provides enterprise-grade LDAP security, custom and external user roles for embedded dashboards, user group assignment, database permissions, analytical sets, and model permissions. The user can address data governance, flow management, alerts, and audit trail and scheduling associated with application programming interface (API) publishing.

The user can schedule data in real-time, near real-time, and batch processes. There is a reason to select ETL (extract, transform, and load) or ELT (extract, load, transform) because the data pipeline builder can be used in the same interface. A user can upload or submit data to the system in a variety of different formats including comma separated value (CSV) files, EXCEL files, text files, Portable Document Format (PDF) files, and unstructured data formats. A rules-based uploader associated with the system allows for zero-error importing. As a result, the system can read and process data such as PDF data and unstructured data into linear formats. A user is able to connect to any RDBMS, API, Rest interface, MongoDB, or SFDC database or interface in order to structure heterogeneous data into a common repository. Data engineers and users can select ETL, ELT, or near realtime data processing. Additionally, the system provides joining between table sets to allow for rapid classification of a repository by defining a data lake or warehouse.

A user can choose a data model and create visualizations using defined segments. Visualizations can be split or reused by defining metric, segment, or graphic visualizations. A user also can write their own SQL to create a visualization.

The system may provide guidance to allow a user to create a graph based on datasets. The user can select from a number of different informational graphical selections and analytical graphs to represent the data. A user can navigate through the data by drilling down into the data. As an example, the system may provide cognitive intelligence to help select a chart or graphic. For example, the user can drag-and-drop a visualization such as a geospatial data presentation using GeoJSON objects.

A user can generate an insight or graphic that represents a particular time period. In addition, a user can make an annotation on the data, obtain a snapshot, and share the snapshot. The visualization can be shared using email, and attached as a number of different formats including image, a PDF, or a spreadsheet.

The system can manage big data by using an offset cube. As a result, the system can rapidly query and summarize data held by or referenced by the system. There is a schema based outer layer that can hold data actions. The system allows for API calls to publish external analytics with third party applications or portals.

Figure 5:
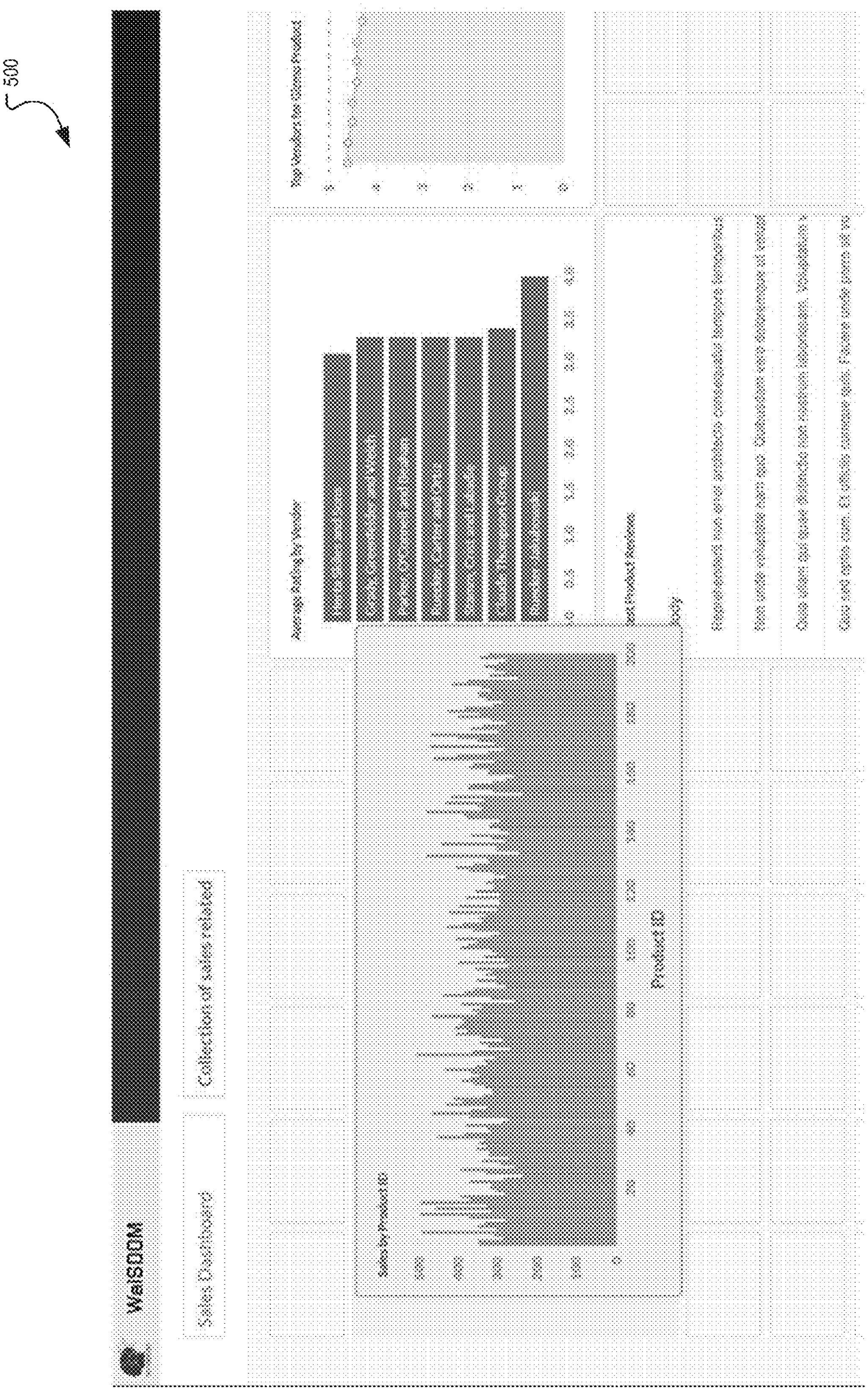
FIGS. 5-19 show screenshots of an example user interface of the data analytical engine application according to an example of the instant disclosure.

FIGS. 5-19 show screenshots of example graphical user interfaces (GUI) associated with the data analytical engine application 106 according to an example of the instant disclosure. As shown in FIG. 5, a screenshot 500 of the graphical user interface (GUI) shows that the GUI may allow a user to easily setup a variety of dashboards and scenarios. The interface allows the user to add, annotate, and selectively publish visualizations.

Figure 6:
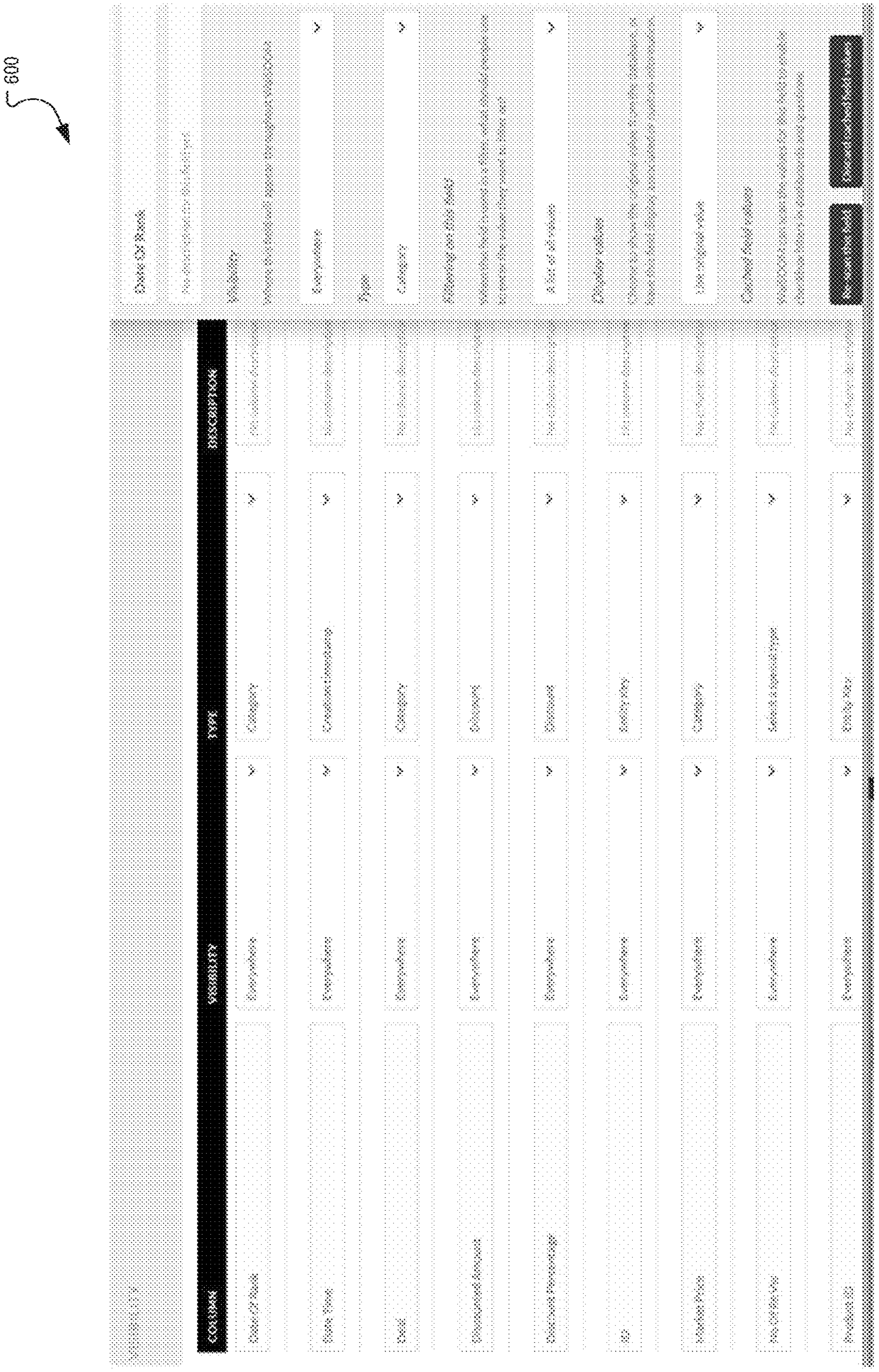

As shown in FIG. 6, a screenshot 600 of the GUI shows that a user can select visibility options for a number of different types of data. Within an administrator panel, the columns that are present in the database 110 can be further modified via a data model interface. The data model interface allows the administrator to determine where and how specific columns can be viewed. Visibility can be used to determine where a particular data column may appear. Type can specify the role that the column has within the data model. Values present in the data column can also be filtered and formatted. When the data model has changed, the values can be re-scanned and cascaded down through the entire data model.

Figure 7:
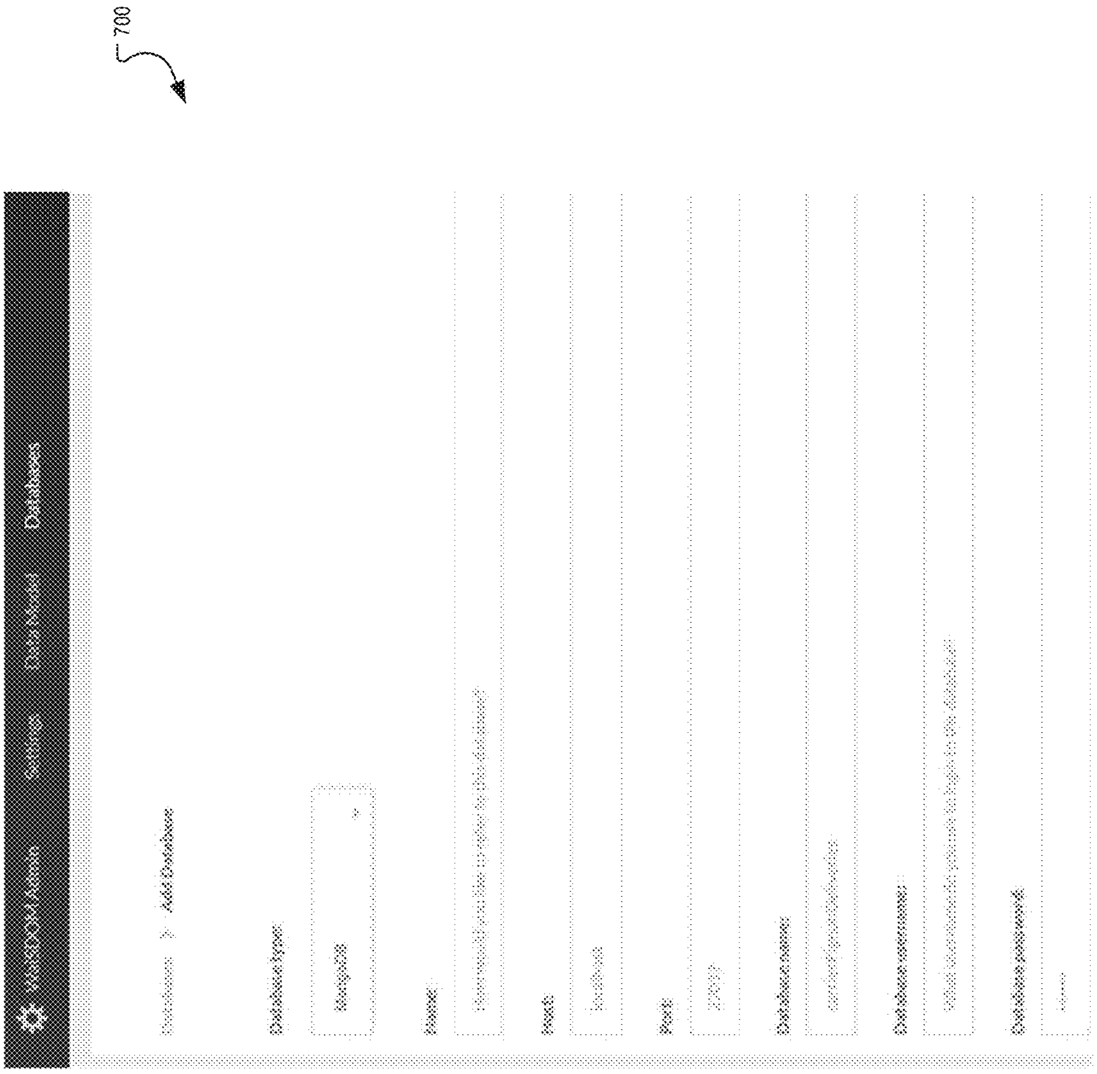

As shown in FIG. 7, a screenshot 700 of the GUI shows that a user can provide database authentication information to connect and add a data source to the system. As further shown in FIG. 7, the user can select a database type, provide a database name, provide host information, e.g., a URL, port number information, a database name, a database username, and a database password, among other information.

Figure 8:
Figure 9:
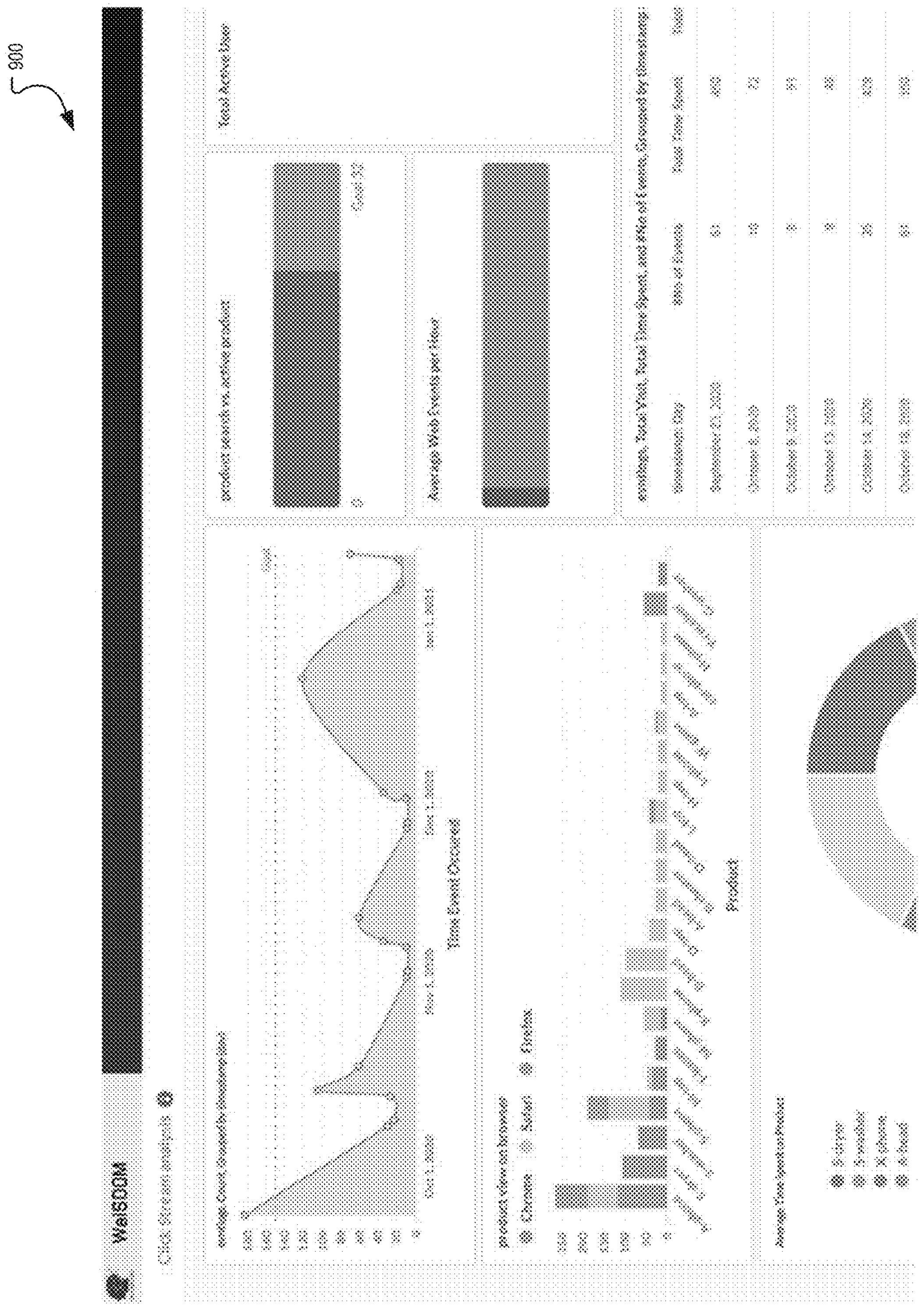
Figure 10:
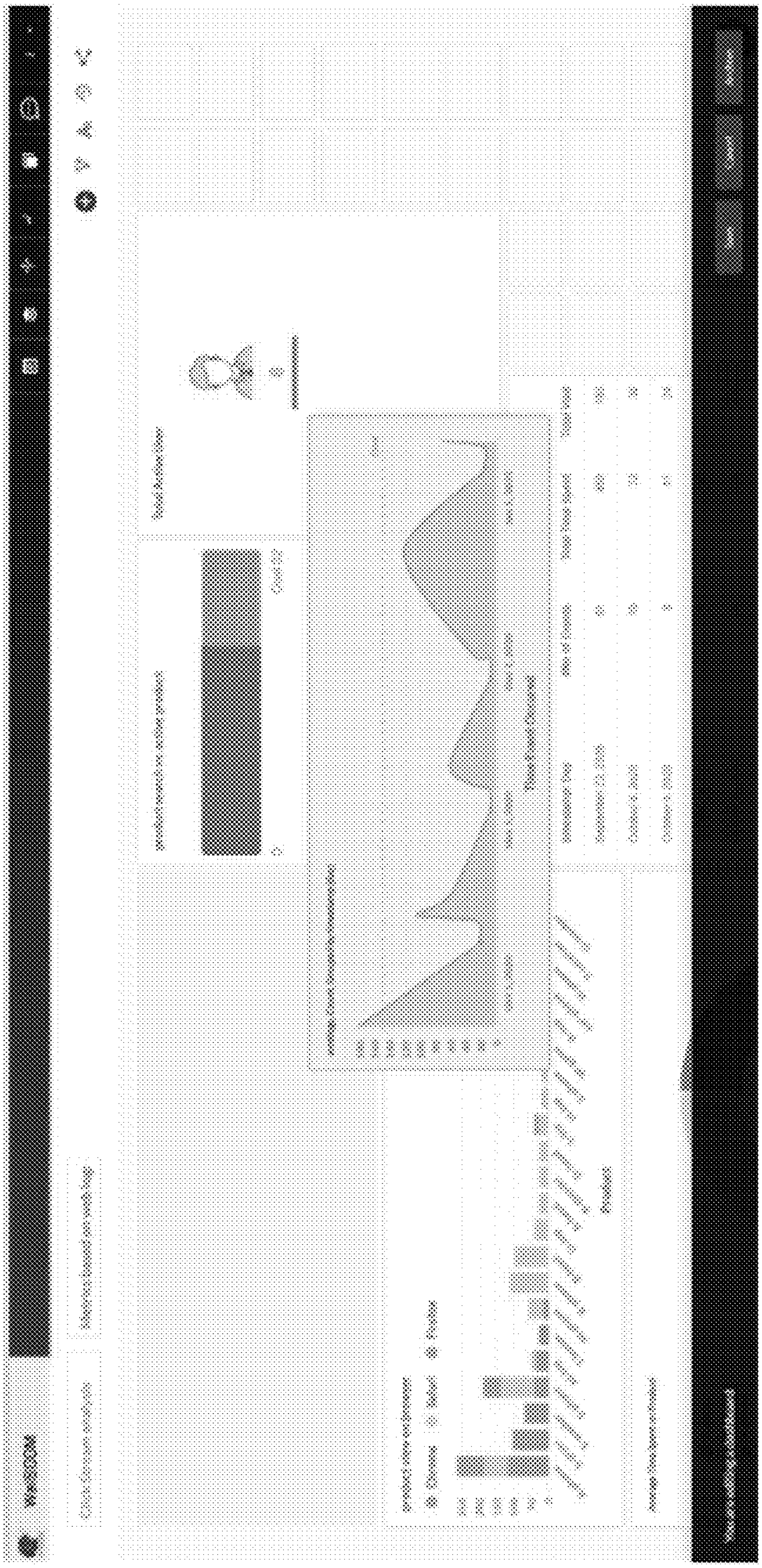
Figure 11:
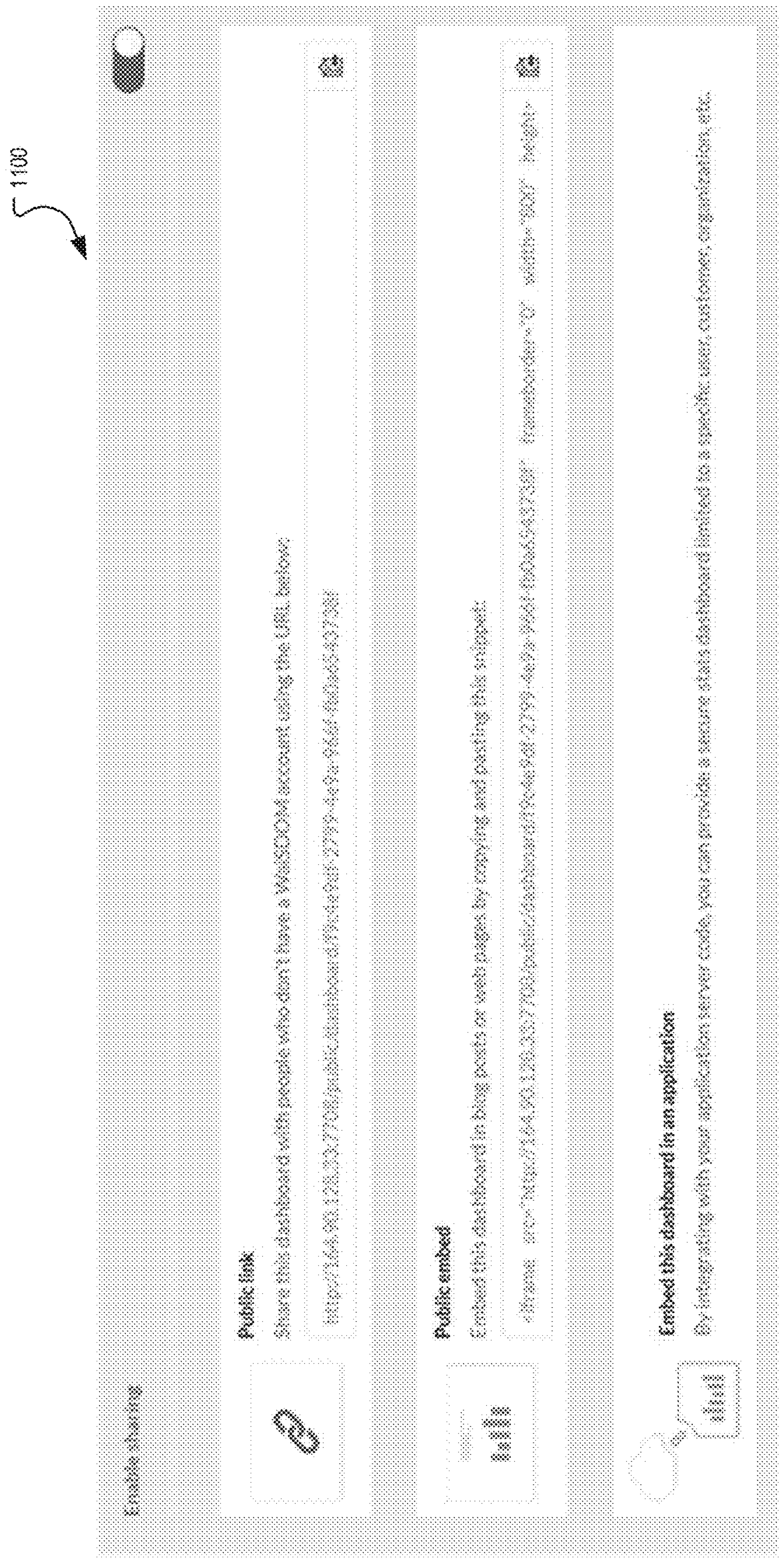
Figure 12:
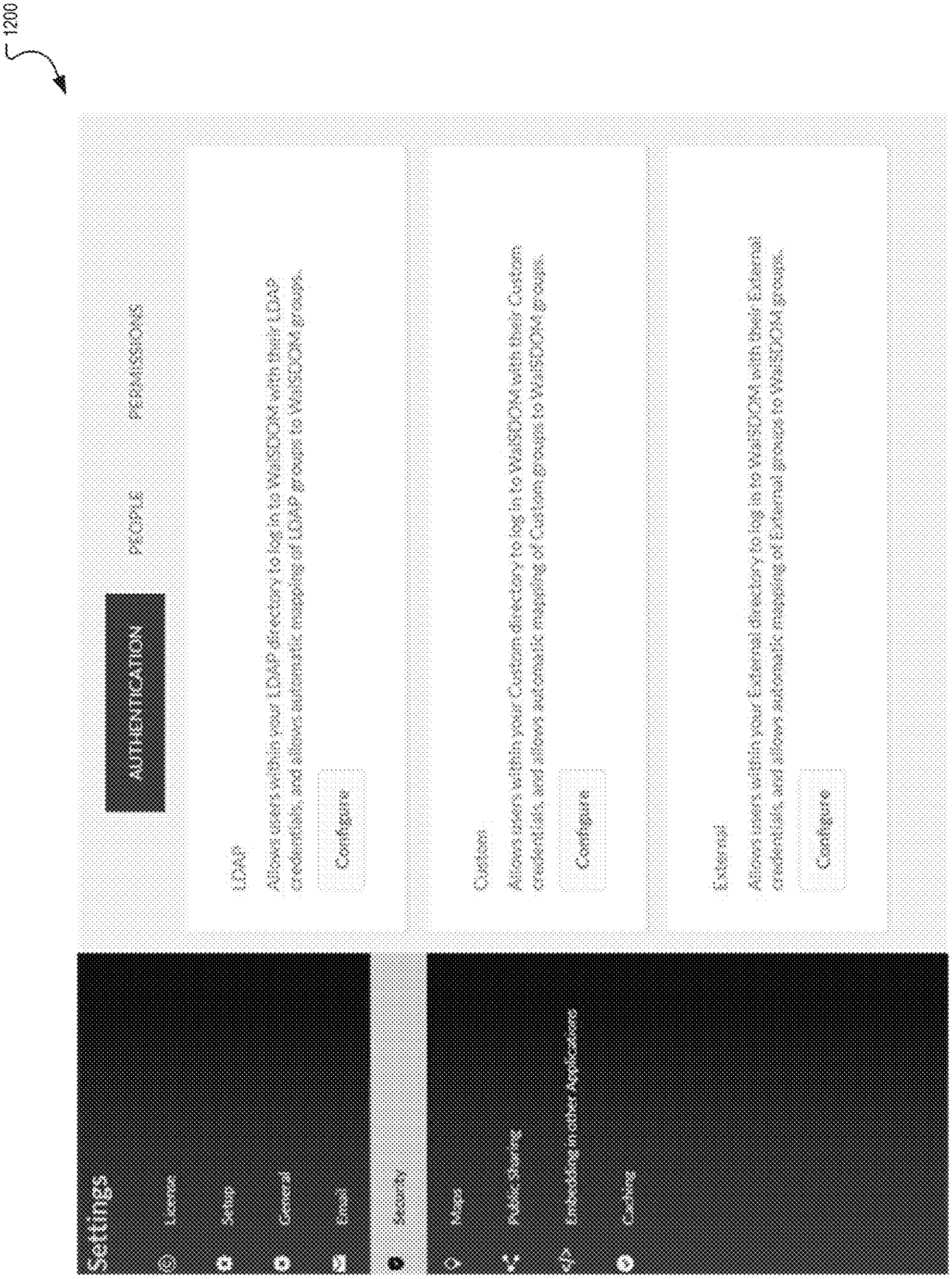
Figure 13:
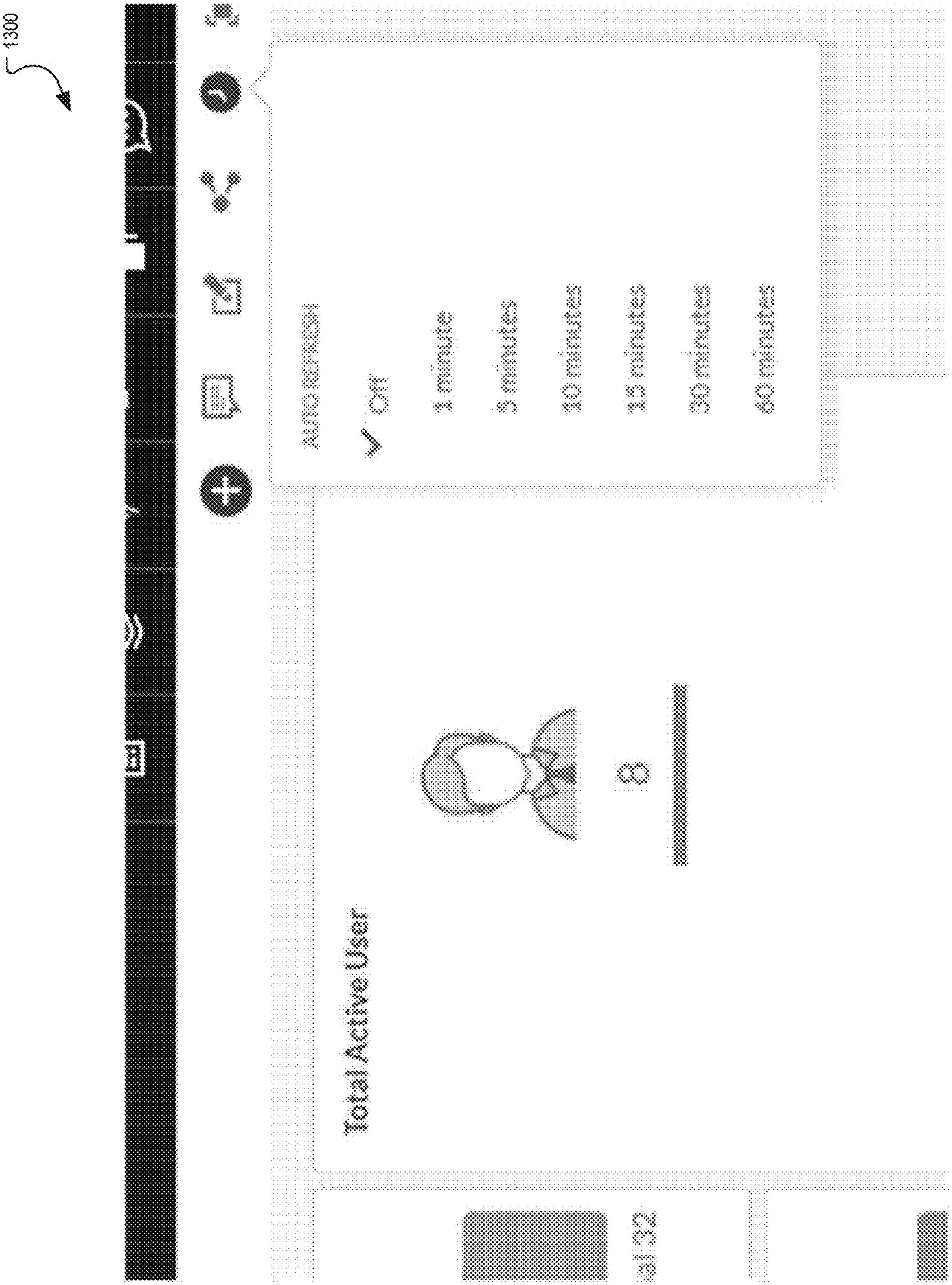
Figure 14:
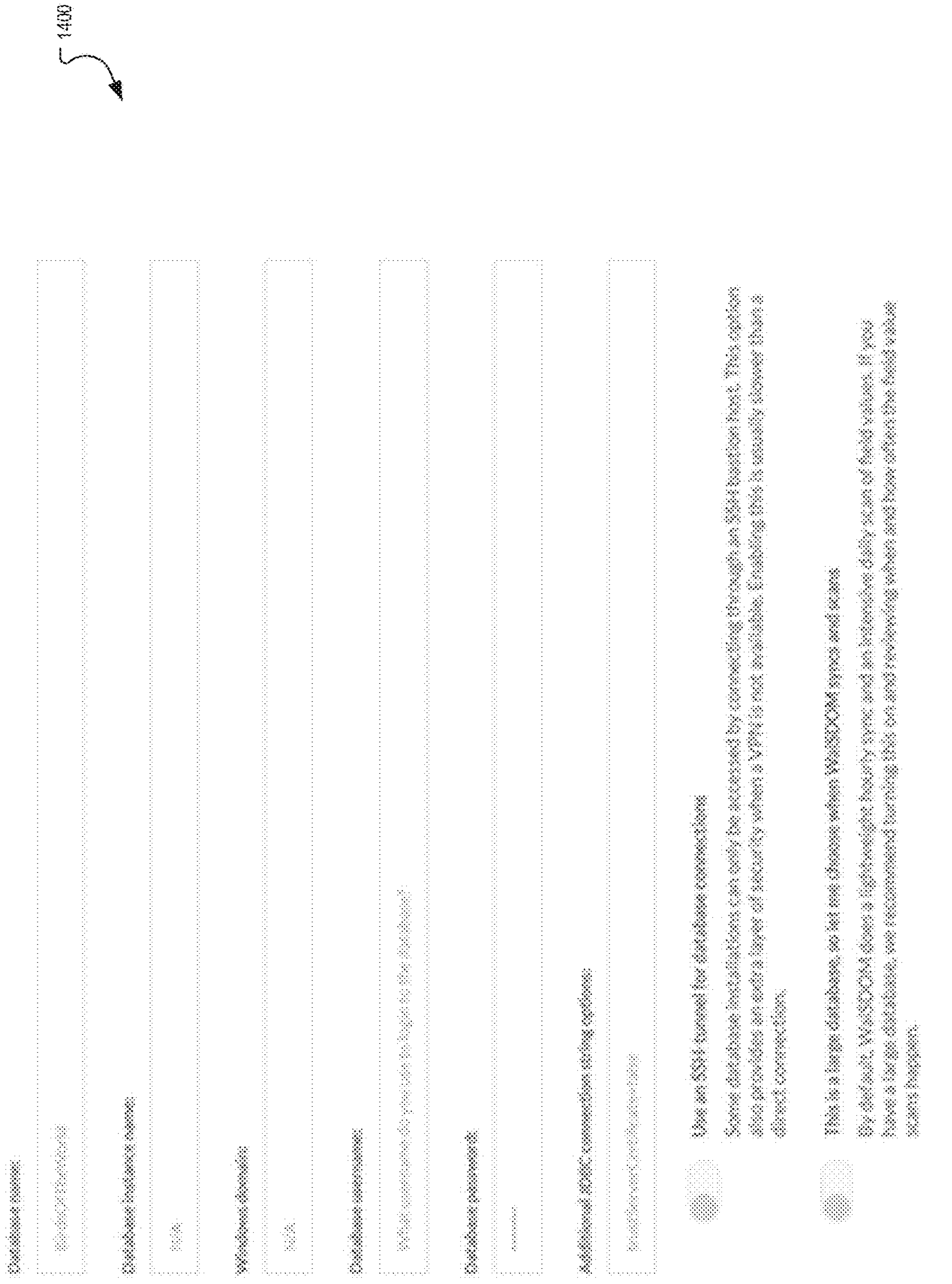

As shown in FIG. 8, a screenshot 800 of the GUI shows that a user can view tables associated with the imported data sources. FIG. 9 shows a screenshot 900 indicating example analytics and visualization information that may be generated by the system 100. As shown in FIG. 10, a screenshot 1000 of the GUI shows that a user can create and edit a dashboard to include one or more visualizations associated with the data including different types of graphs. As shown in FIG. 11, a screenshot 1100 of the GUI shows that a user can share a dashboard by creating a publicly available link or URL, can generate code to embed the dashboard, and can embed the dashboard in an application. As shown in FIG. 12, a screenshot 1200 of the GUI shows that a user can setup a number of different security options including security associated with Lightweight Directory Access Protocol (LDAP), custom credentials, and external security options. As shown in FIG. 13, a screenshot 1300 of the GUI shows that a user can select an option that may automatically refresh a dashboard at a particular interval of time such as every minute, every five minutes, every ten minutes, every fifteen minutes, every thirty minutes, and every hour, among other options. The automatic refresh may determine whether there is any change in the data associated with the original source, e.g., the first data source and the second data source. FIG. 14 shows a screenshot 1400 of the GUI indicating additional options that allow a user to import and connect data from other data sources.

Figure 15:
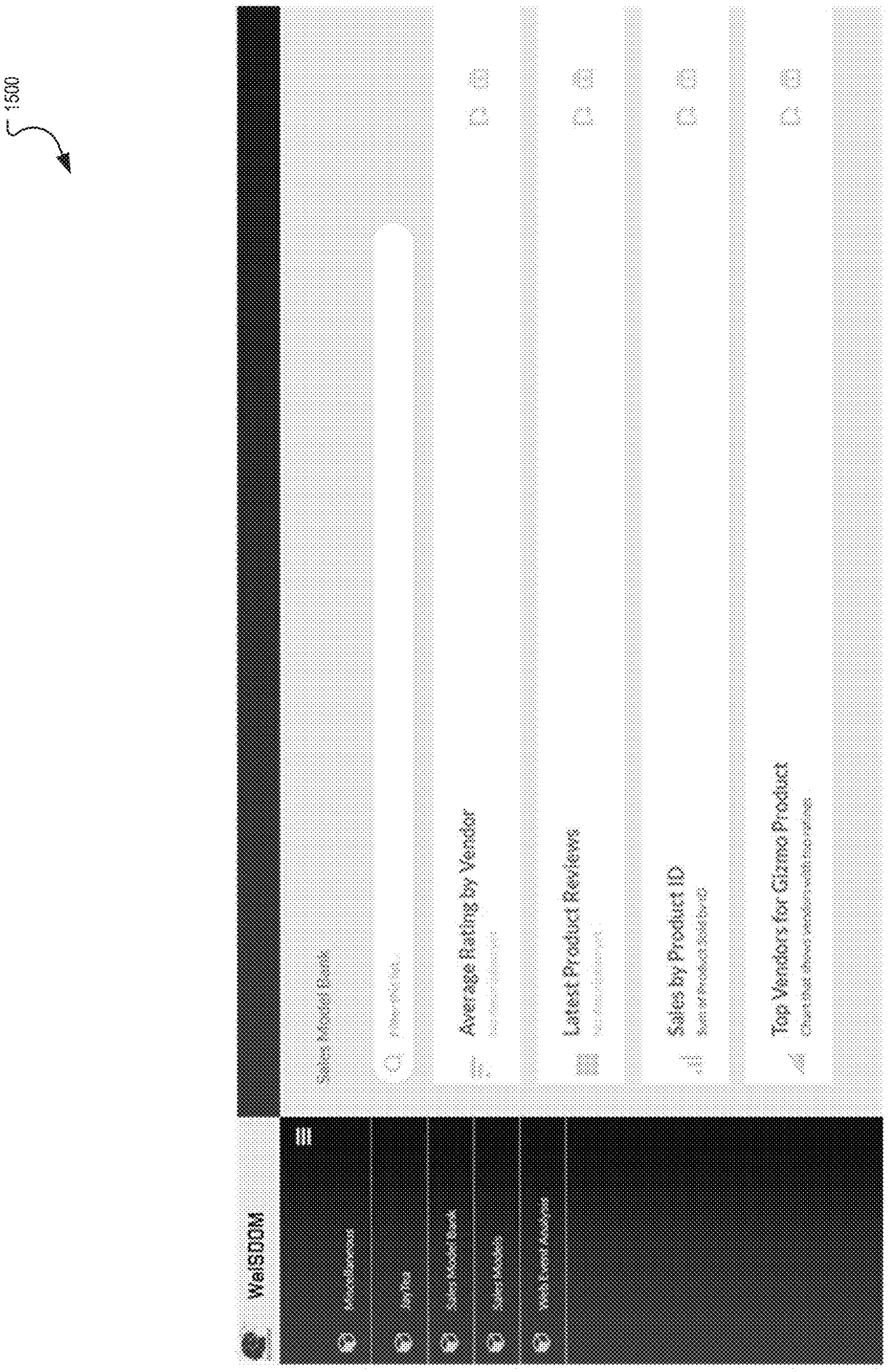
Figure 16:
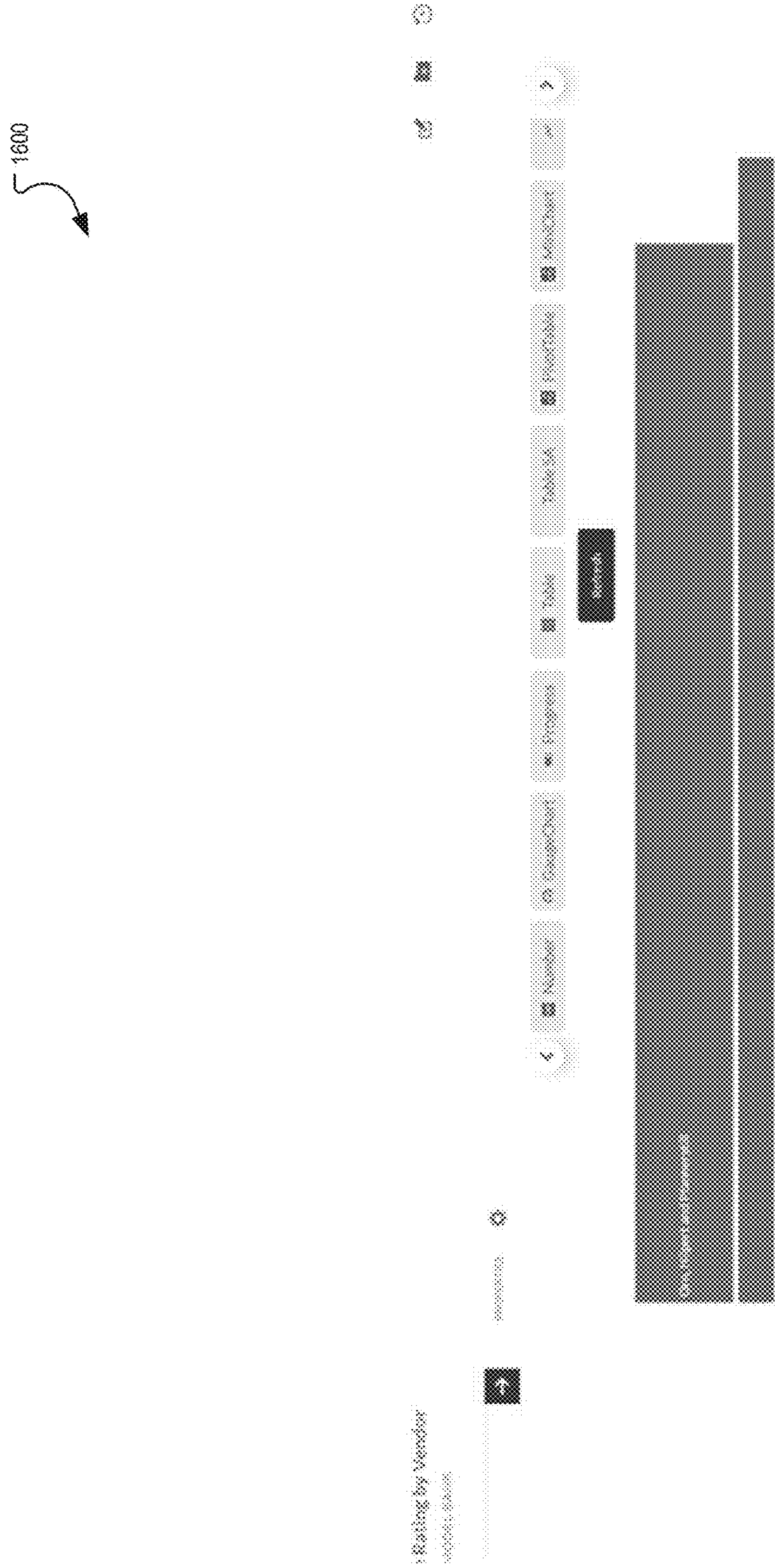
Figure 17:
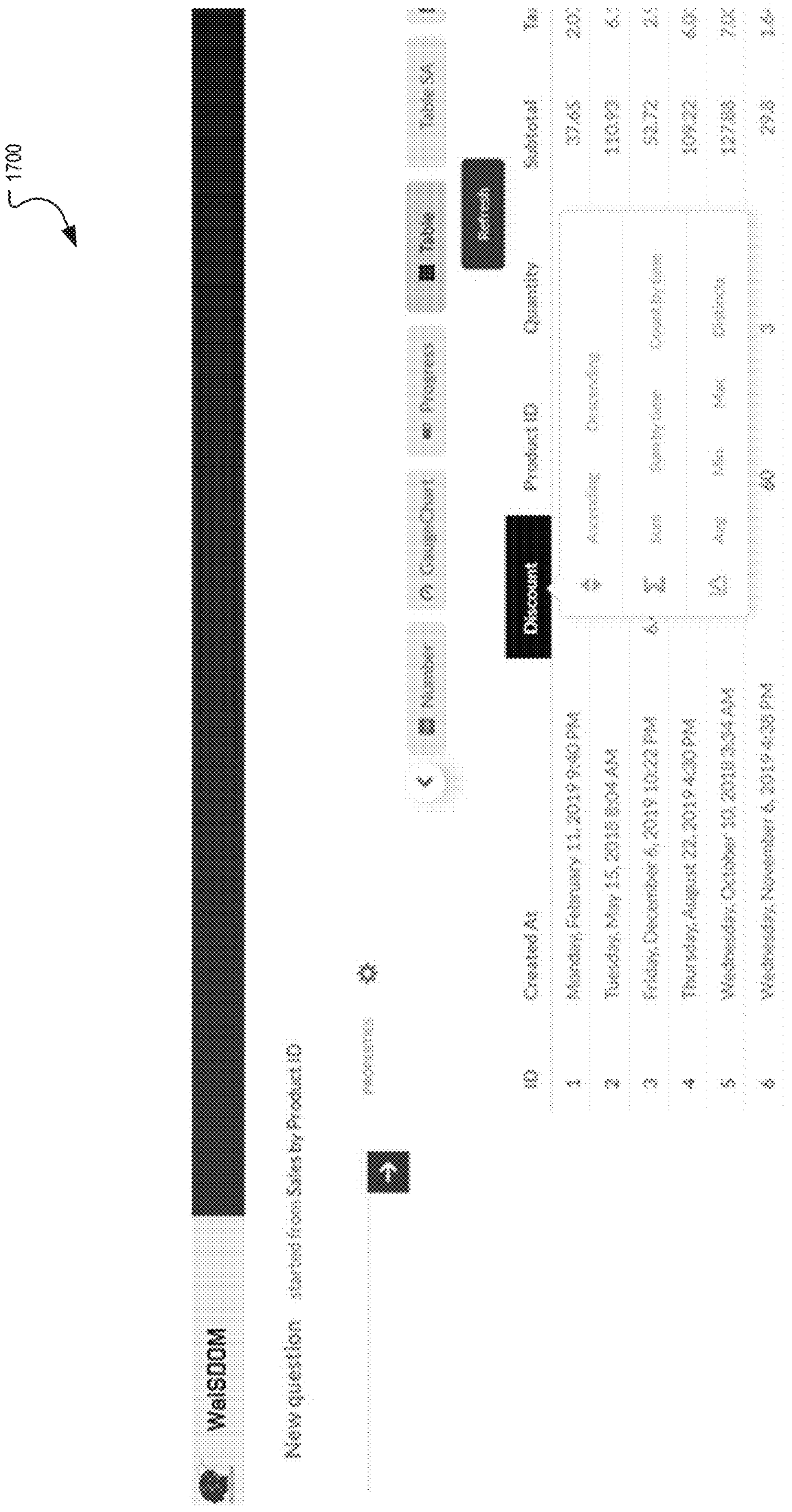
Figure 18:
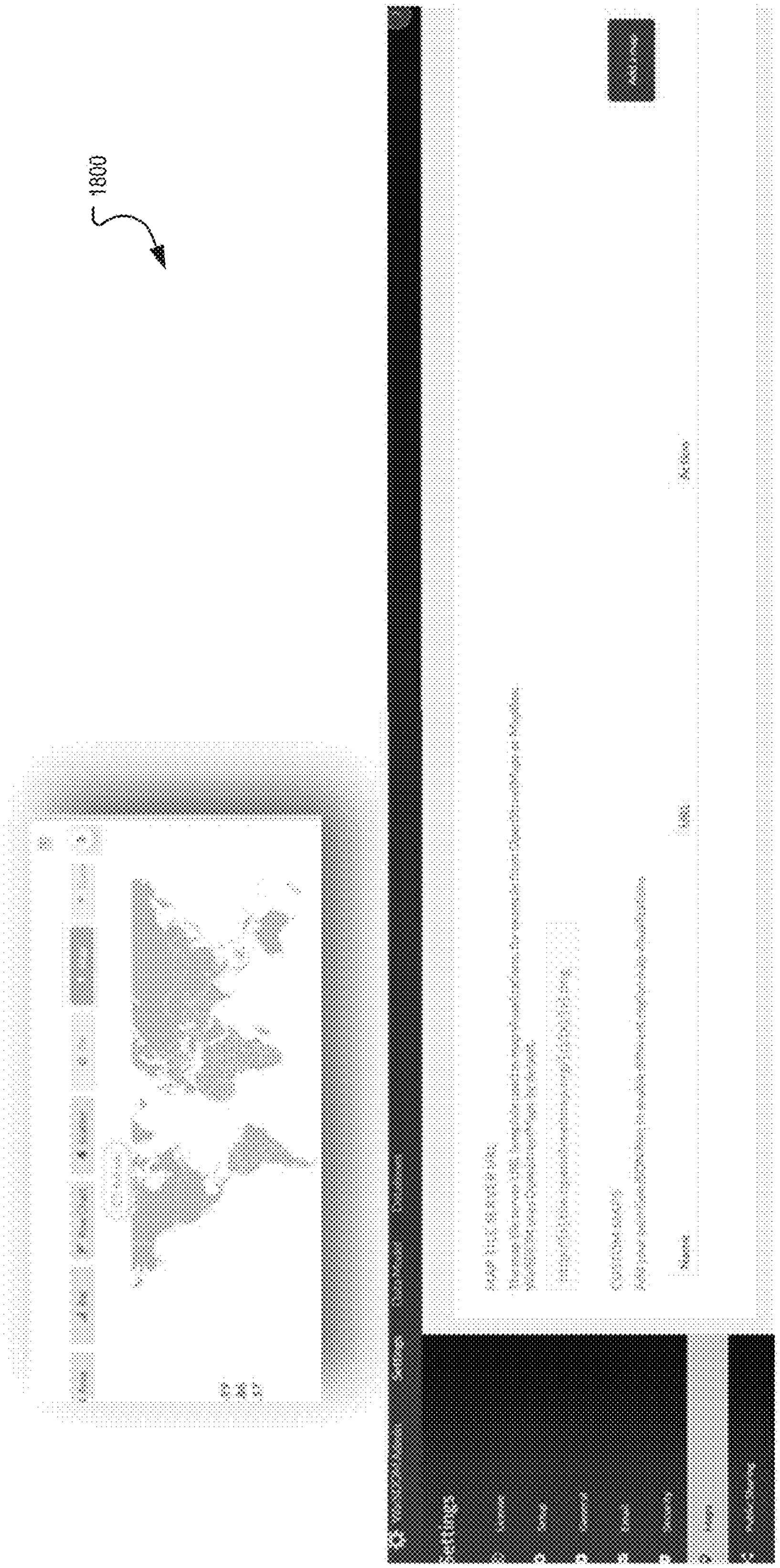
Figure 19:
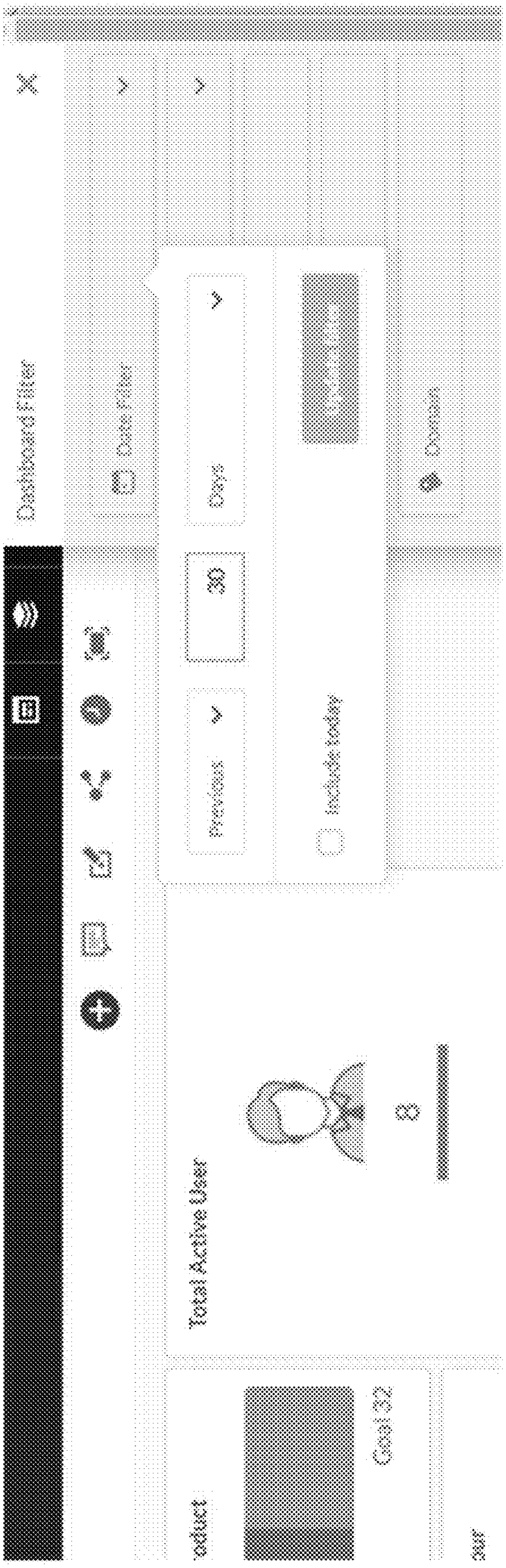

FIG. 15 shows a screenshot 1500 of the GUI indicating a number of different sales model banks that a user can select from to generate different visualizations including an average rating by vendor, latest product reviews, sales by product ID, and top vendors for Gizmo product. FIG. 16 shows a screenshot 1600 of the GUI having an example of a rating by vendor selection. FIG. 17 shows a screenshot 1700 of the GUI having an example of sale by product ID selection. FIG. 18 shows a screenshot 1800 having an example of an interface that allows a user to generate a map using the data and an example map generated using the data. FIG. 19 shows a screenshot 1900 of the GUI having an example of a filter associated with a dashboard that allows a user to display data on the dashboard based on the filter, e.g., data associated with a previous thirty days.

Figure 20:
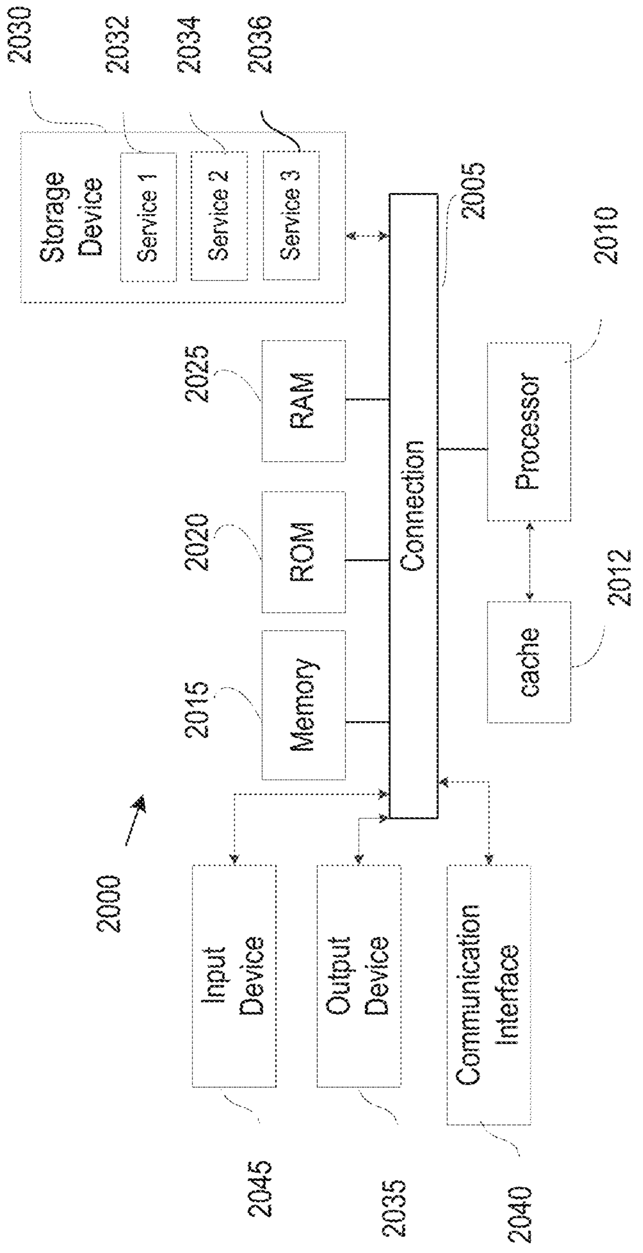
FIG. 20 shows an example of a system for implementing certain aspects of the present technology.

FIG. 20 shows an example of computing system 2000, which can be, for example, any computing device making up the computing device such as the client computing device 102, the server computing device 104, or any component thereof in which the components of the system are in communication with each other using connection 2005. Connection 2005 can be a physical connection via a bus, or a direct connection into processor 2010, such as in a chipset architecture. Connection 2005 can also be a virtual connection, networked connection, or logical connection.

In some embodiments, computing system 2000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 2000 includes at least one processing unit (CPU or processor) 2010 and connection 2005 that couples various system components including system memory 2015, such as read-only memory (ROM) 2020 and random access memory (RAM) 2025 to processor 2010. Computing system 2000 can include a cache of high-speed memory 2012 connected directly with, in close proximity to, or integrated as part of processor 2010.

Processor 2010 can include any general purpose processor and a hardware service or software service, such as services 2032, 2034, and 2036 stored in storage device 2030, configured to control processor 2010 as well as a special-purpose processor where software instructions are incorporated into the actual processor design. Processor 2010 may essentially be a completely self-contained computing system, containing multiple cores or processors, a bus, memory controller, cache, etc. A multi-core processor may be symmetric or asymmetric.

To enable user interaction, computing system 2000 includes an input device 2045, which can represent any number of input mechanisms, such as a microphone for speech, a touch-sensitive screen for gesture or graphical input, keyboard, mouse, motion input, speech, etc. Computing system 2000 can also include output device 2035, which can be one or more of a number of output mechanisms known to those of skill in the art. In some instances, multimodal systems can enable a user to provide multiple types of input/output to communicate with computing system 2000. Computing system 2000 can include communications interface 2040, which can generally govern and manage the user input and system output. There is no restriction on operating on any particular hardware arrangement, and therefore the basic features here may easily be substituted for improved hardware or firmware arrangements as they are developed.

Storage device 2030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 2030 can include software services, servers, services, etc., that when the code that defines such software is executed by the processor 2010, it causes the system to perform a function. In some embodiments, a hardware service that performs a particular function can include the software component stored in a computer-readable medium in connection with the necessary hardware components, such as processor 2010, connection 2005, output device 2035, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A system comprising: a memory storing computer-readable instructions; and at least one processor to execute the instructions to receive database authentication information from a client computing device, continually obtain data from a first data source using the database authentication information, the first data source storing data having a first representation of the data, continually convert and store the data in a second data source in real-time as the data is received in the first data source, the second data source having a second representation of the data that is different from the first representation of the data, receive a selection of at least one machine learning algorithm from a customizable library of machine learning algorithms, each machine learning algorithm to perform at least one operation on the data in the second data source, receive a request to create a visualization of the data and generate a visualization of the data using the second representation of the data based on the at least one machine learning algorithm, and transmit the visualization of the data to the client computing device.

Aspect 2: The system of Aspect 1, wherein the second representation of the data comprises a hypercube.

Aspect 3: The system of Aspects 1 and 2, wherein the second representation of the data uses directed acrylic graphs (DAGs), dynamic aggregation, in-memory access, and use of hypercube data organization to provide improved data latency.

Aspect 4: The system of Aspects 1 to 3, wherein the database authentication information comprises at least one of a database type, a name, host information, a port number, a database name, a database username, and a database password.

Aspect 5: The system of Aspects 1 to 4, wherein the first data source comprises at least one of one or more files, one or more databases, one or more data warehouses, and one or more relational database management systems (RDBMS).

Aspect 6: The system of Aspects 1 to 5, the at least one processor further to determine a recommendation for the visualization of the data.

Aspect 7: The system of Aspects 1 to 6, the at least one processor further to further to receive a selection of a subset of machine learning algorithms from the customizable library of machine learning algorithms as favorite machine learning algorithms and add at least one of the subset of machine learning algorithms to a template to perform at least one operation on the data.

Aspect 8: A method comprising receiving, by at least one processor, database authentication information from a client computing device, continually obtaining, by the at least one processor, data from a first data source using the database authentication information, the first data source storing data having a first representation of the data, continually converting and storing, by the at least one processor, the data in a second data source in real-time as the data is received in the first data source, the second data source having a second representation of the data that is different from the first representation of the data, receiving, by the at least one processor, a selection of at least one machine learning algorithm from a customizable library of machine learning algorithms, each machine learning algorithm to perform at least one operation on the data in the second data source, receiving, by the at least one processor, a request to create a visualization of the data and generating a visualization of the data using the second representation of the data based on the at least one machine learning algorithm, and transmitting, by the at least one processor, the visualization of the data to the client computing device.

Aspect 9: The method of Aspect 8, wherein the second representation of the data comprises a hypercube.

Aspect 10: The method of Aspect 8 and 9, wherein the second representation of the data uses directed acrylic graphs (DAGs), dynamic aggregation, in-memory access, and use of hypercube data organization to provide improved data latency.

Aspect 11: The method of Aspects 8 to 10, wherein the database authentication information comprises at least one of a database type, a name, host information, a port number, a database name, a database username, and a database password.

Aspect 12: The method of Aspects 8 to 11, wherein the first data source comprises at least one of one or more files, one or more databases, one or more data warehouses, and one or more relational database management systems (RDBMS).

Aspect 13: The method of Aspects 8 to 12, further comprising determining a recommendation for the visualization of the data.

Aspect 14: The method of Aspects 8 to 13, further comprising receiving a selection of a subset of machine learning algorithms from the customizable library of machine learning algorithms as favorite machine learning algorithms and adding at least one of the subset of machine learning algorithms to a template to perform at least one operation on the data.

Aspect 15: A non-transitory computer-readable storage medium, having instructions stored thereon that, when executed by a computing device cause the computing device to perform operations, the operations comprising receiving database authentication information from a client computing device, continually obtaining data from a first data source using the database authentication information, the first data source storing data having a first representation of the data, continually converting and storing the data in a second data source in real-time as the data is received in the first data source, the second data source having a second representation of the data that is different from the first representation of the data, receiving a selection of at least one machine learning algorithm from a customizable library of machine learning algorithms, each machine learning algorithm to perform at least one operation on the data in the second data source, receiving a request to create a visualization of the data and generating a visualization of the data using the second representation of the data based on the at least one machine learning algorithm, and transmitting the visualization of the data to the client computing device.

Aspect 16: The non-transitory computer-readable storage medium of Aspect 15, wherein the second representation of the data comprises a hypercube.

Aspect 17: The non-transitory computer-readable storage medium of Aspects 15 and 16, wherein the second representation of the data uses directed acrylic graphs (DAGs), dynamic aggregation, in-memory access, and use of hypercube data organization to provide improved data latency.

Aspect 18: The non-transitory computer-readable storage medium of Aspects 15 to 17, wherein the database authentication information comprises at least one of a database type, a name, host information, a port number, a database name, a database username, and a database password.

Aspect 19: The non-transitory computer-readable storage medium of Aspects 15 to 18, wherein the first data source comprises at least one of one or more files, one or more databases, one or more data warehouses, and one or more relational database management systems (RDBMS).

Aspect 20: The non-transitory computer-readable storage medium of Aspects 15 to 19, the operations further comprising determining a recommendation for the visualization of the data.

What is claimed is:

1. An Artificial Intelligence (AI) based data analytical system for one or more industry sectors comprising:

a non-transitory memory storing computer-readable instructions; and at least one hardware processor to execute the computer-readable instructions to:

receive database authentication information from a client computing device, wherein upon receiving the database authentication information one or more security configurations are initialized, including the one or more security configurations associated with Lightweight Directory Access Protocol (LDAP), custom credentials, and external security options;

continually obtain data from a first data source using the database authentication information, the first data source storing the data having a first representation of the data;

continually convert and store the data in a second source in real-time as the data is received in the first data source, the second data source having a second representation of the data that is different from the first representation of the data, wherein the second representation of the data comprises at least one of: a hypercube and an offset cube, wherein the offset cube is used to manage big data by performing aggregation on-the-fly during data ingestion into a connected database, thereby eliminating a need for regeneration or reloading of cubes upon arrival of new data, wherein a directed acyclic graph (DAG) governs, cleans, and builds a pipeline for aggregation on-the-fly for the new data, wherein the AI based data analytical system is configured to interrogate data on-the-fly through optimization of the offset cube;

receive a selection of at least one machine learning algorithm from a customizable library of machine learning algorithms, including a subset of favorite machine learning algorithms, wherein the at least one machine learning algorithm is selected, dragged and dropped into the pipeline within an end-to-end no-code data to insight platform, and add at least one of the favorite machine learning algorithms to a template to perform at least one operation on the data in the second data source, wherein the customizable library of machine learning algorithms comprises at least one of one or more: artificial intelligence (AI) models, deep learning (DL) algorithms, and natural language processing (NLP) algorithms;

receive a request to create a visualization of the data and generate a visualization of the data using the second representation of the data based on the at least one machine learning algorithm;

determine recommendations for created visualizations of the data through a generative AI enabled recommendation engine, wherein the generative AI enabled recommendation engine is configured to generate a natural language interpretation of output of the at least one machine learning algorithm to guide user decision making; and transmit the visualization and recommendations of the data to the client computing device.

2. The AI based data analytical system of claim 1, wherein the database authentication information comprises at least one of a database type, a name, host information, a port number, a database name, a database username, and a database password.

3. The AI based data analytical system of claim 1, wherein the first data source comprises at least one of one or more files, one or more databases, one or more data warehouses, and one or more relational database management systems (RDBMS).

4. An Artificial Intelligence (AI) based data analytical method, for one or more industry sectors comprising:

receiving, by at least one hardware processor, database authentication information from a client computing device, wherein upon receiving the database authentication information one or more security configurations are initialized, including the one or more security configurations associated with Lightweight Directory Access Protocol (LDAP), custom credentials, and external security options;

continually obtaining, by the at least one hardware processor, data from a first data source using the database authentication information, the first data source storing data having a first representation of the data;

continually converting and storing, by the at least one hardware processor, the data in a second data source in real-time as the data is received in the first data source, the second data source having a second representation of the data that is different from the first representation of the data, wherein the second representation of the data comprises at least one of: a hypercube and an offset cube, wherein the offset cube is used to manage big data by performing aggregation on-the-fly during data ingestion into a connected database, thereby eliminating a need for regeneration or reloading of cubes upon arrival of new data, wherein a directed acyclic graph (DAG) governs, cleans, and builds a pipeline for aggregation on-the-fly for the new data, wherein a system is configured to interrogate data on-the-fly through optimization of the offset cube;

receiving, by the at least one hardware processor, a selection of at least one machine learning algorithm from a customizable library of machine learning algorithms, including a subset of favorite machine learning algorithms, wherein the at least one machine learning algorithm is selected, dragged and dropped into the pipeline within an end-to-end no-code data to insight platform, and add at least one of the favorite machine learning algorithms to a template to perform at least one operation on the data in the second data source, wherein the customizable library of machine learning algorithms comprises at least one of one or more: artificial intelligence (AI) models, deep learning (DL) algorithms, and natural language processing (NLP) algorithms;

receiving, by the at least one hardware processor, a request to create a visualization of the data and generating a visualization of the data using the second representation of the data based on the at least one machine learning algorithm;

determining, by the at least one hardware processor, recommendations for created visualizations of the data through a generative AI enabled recommendation engine, wherein the generative AI enabled recommendation engine is configured to generate a natural language interpretation of output of the at least one machine learning algorithm to guide user decision making; and transmitting, by the at least one hardware processor, the visualization and recommendations of the data to the client computing device.

5. The AI based data analytical method of claim 4, wherein the database authentication information comprises at least one of a database type, a name, host information, a port number, a database name, a database username, and a database password.

6. The AI based data analytical method of claim 4, wherein the first data source comprises at least one of one or more files, one or more databases, one or more data warehouses, and one or more relational database management systems (RDBMS).

7. A non-transitory computer-readable storage medium, having instructions stored thereon that, when executed by a computing device cause the computing device to perform operations, the operations comprising:

receiving database authentication information from a client computing device, wherein upon receiving the database authentication information one or more security configurations are initialized, including the one or more security configurations associated with Lightweight Directory Access Protocol (LDAP), custom credentials, and external security options;

continually obtaining data from a first data source using the database authentication information, the first data source storing data having a first representation of the data;

continually converting and storing the data in a second data source in real-time as the data is received in the first data source, the second data source having a second representation of the data that is different from the first representation of the data, wherein the second representation of the data comprises at least one of: a hypercube and an offset cube, wherein the offset cube is used to manage big data by performing aggregation on-the-fly during data ingestion into a connected database, thereby eliminating a need for regeneration or reloading of cubes upon arrival of new data, wherein a directed acyclic graph (DAG) governs, cleans, and builds a pipeline for aggregation on-the-fly for the new data, wherein a system is configured to interrogate the data on-the-fly through optimization of the offset cube;

receiving a selection of at least one machine learning algorithm from a customizable library of machine learning algorithms, including a subset of favorite machine learning algorithms, wherein the at least one machine learning algorithm is selected, dragged and dropped into the pipeline within an end-to-end no-code data to insight platform, and add at least one of the favorite machine learning algorithms to a template to perform at least one operation on the data in the second data source, wherein the customizable library of machine learning algorithms comprises at least one of one or more: artificial intelligence (AI) models, deep learning (DL) algorithms, and natural language processing (NLP) algorithms;

receiving a request to create a visualization of the data and generating a visualization of the data using the second representation of the data based on the at least one machine learning algorithm;

determining recommendations for created visualizations of the data through a generative AI enabled recommendation engine, wherein the generative AI enabled recommendation engine is configured to generate a natural language interpretation of output of the at least one machine learning algorithm to guide user decision making; and transmitting the visualization and recommendations of the data to the client computing device.

8. The non-transitory computer-readable storage medium of claim 7, wherein the database authentication information comprises at least one of a database type, a name, host information, a port number, a database name, a database username, and a database password.

9. The non-transitory computer-readable storage medium of claim 7, wherein the first data source comprises at least one of one or more files, one or more databases, one or more data warehouses, and one or more relational database management systems (RDBMS).

* * * * *